US008016893B2

(12) United States Patent
Weinberg et al.

(10) Patent No.: US 8,016,893 B2
(45) Date of Patent: Sep. 13, 2011

(54) GEAR BEARING DRIVE

(75) Inventors: Brian Weinberg, Brookline, MA (US); Constantinos Mavroidis, Arlington, MA (US); John M. Vranish, Crofton, MD (US)

(73) Assignees: The United States of America as represented by the Administrator of the National Aeronautics and Space Administration, Washington, DC (US); Northeastern University, Boston, MA (US)

( * ) Notice: Subject to any disclaimer, the term of this patent is extended or adjusted under 35 U.S.C. 154(b) by 752 days.

(21) Appl. No.: 11/821,095

(22) Filed: Jun. 21, 2007

(65) Prior Publication Data
US 2008/0045374 A1 Feb. 21, 2008

Related U.S. Application Data

(60) Provisional application No. 60/815,313, filed on Jun. 21, 2006.

(51) Int. Cl.
*A61F 2/54* (2006.01)
*A61F 2/68* (2006.01)

(52) U.S. Cl. ............... 623/57; 475/5; 475/149; 475/150; 475/342

(58) Field of Classification Search .................... 623/59; 74/490.01
See application file for complete search history.

(56) References Cited

U.S. PATENT DOCUMENTS

| 5,647,723 | A | * | 7/1997 | Rush | 414/735 |
|---|---|---|---|---|---|
| 5,679,087 | A | * | 10/1997 | Lutz | 475/149 |
| 5,851,162 | A | * | 12/1998 | Tether | 475/150 |
| 6,394,924 | B1 | * | 5/2002 | Schiebold et al. | 475/5 |
| 6,423,099 | B1 | * | 7/2002 | Iversen et al. | 623/64 |
| 6,626,792 | B2 | | 9/2003 | Vranish | 475/331 |
| 7,014,586 | B2 | | 3/2006 | Randall | |
| 7,276,009 | B2 | | 10/2007 | Börnchen et al. | |
| 7,334,558 | B2 | | 2/2008 | Higgins | |
| 2002/0007691 | A1 | * | 1/2002 | Peter | 74/473.12 |
| 2005/0204850 | A1 | * | 9/2005 | Nihei et al. | 74/490.01 |
| 2006/0073933 | A1 | | 4/2006 | Vranish | 475/331 |
| 2006/0219039 | A1 | | 10/2006 | Vranish | 74/461 |
| 2006/0264296 | A1 | * | 11/2006 | Moeller | 475/275 |
| 2007/0149335 | A1 | * | 6/2007 | Strauss et al. | 475/5 |
| 2008/0070736 | A1 | | 3/2008 | Yoshino et al. | |
| 2008/0288088 | A1 | * | 11/2008 | Langenfeld et al. | 623/57 |

FOREIGN PATENT DOCUMENTS

| DE | 101 61 942 A1 | 7/2003 |
|---|---|---|
| EP | 1 547 568 A1 | 6/2005 |
| WO | WO 98/22734 A1 | 5/1998 |
| WO | WO 2006/102590 | 9/2006 |

OTHER PUBLICATIONS

The Start of a New Movement, Feature Article, Aug. 2002; www.memagazine.org/backissues/membersonly/aug02/features/startnew/startnew.html.
U.S. Appl. No. 60/664,464, Mar. 24, 2005, Higgins.

* cited by examiner

*Primary Examiner* — Bruce E Snow
*Assistant Examiner* — Melissa Hoban
(74) *Attorney, Agent, or Firm* — Weingarten, Schurgin, Gagnebin & Lebovici LLP

(57) ABSTRACT

A gear bearing drive provides a compact mechanism that operates as an actuator providing torque and as a joint providing support. The drive includes a gear arrangement integrating an external rotor DC motor within a sun gear. Locking surfaces maintain the components of the drive in alignment and provide support for axial loads and moments. The gear bearing drive has a variety of applications, including as a joint in robotic arms and prosthetic limbs.

47 Claims, 29 Drawing Sheets

Pinion/Planet Roller Bearings, Sun Gear Roller Bearings, and Ring Gear Roller Bearings Mate with the End Tips of Gear Teeth to Provide Axial Support Locking the Structure Together

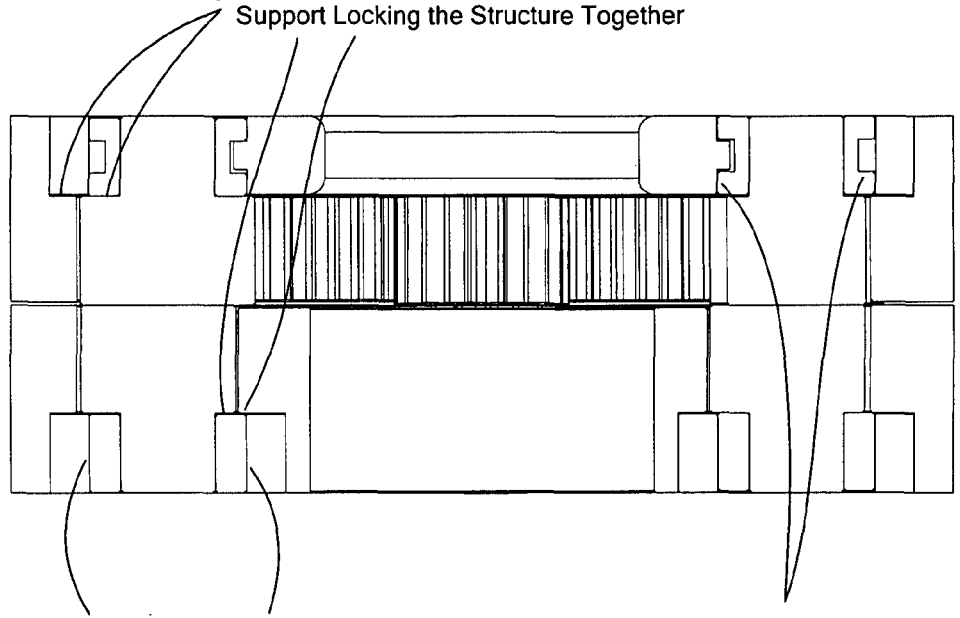

Pinion/Planet Roller Bearings Mate with Sun Gear Roller Bearing, and Ring Gear Roller Bearings Radially Outward Facing Surfaces. Rolling Contact Provides Rigid Structure and Low Friction

*FIG. 30*

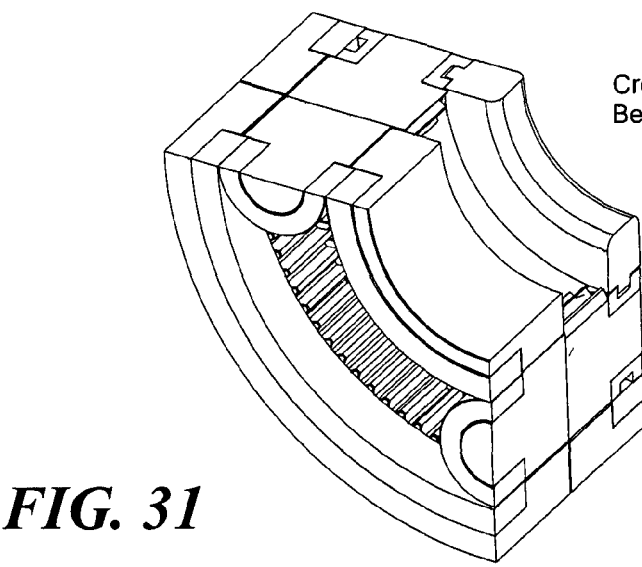

Cross-Section of Gear Bearing Drive Structure

*FIG. 31*

GEAR BEARING DRIVE

CROSS REFERENCE TO RELATED APPLICATIONS

This application claims the benefit under 35 U.S.C. §119 (e) of U.S. Provisional Application No. 60/815,313, filed Jun. 21, 2006, the disclosure of which is incorporated by reference herein.

STATEMENT REGARDING FEDERALLY SPONSORED RESEARCH OR DEVELOPMENT

N/A

FIELD OF THE INVENTION

The present invention relates to a gear bearing drive and its use in a variety of applications, including prosthetic limbs and robotic arms.

BACKGROUND OF THE INVENTION

A gear bearing is a mechanical structure comprising both gear and roller bearing surfaces such that the mechanical power structure and bearing motion control functions are performed without the need for dedicated bearings. Gear bearings take both component and device forms. Gear bearing components can be constructed in many forms, and gear bearing components can be directly interfaced to each other as modules to form gear bearing devices. Gear bearing devices use rolling friction throughout, so external bearings are not required. Epicyclical gear bearing speed reducers are easily constructed using gear bearing technology and these provide good speed reduction in a compact package. "Rock Lock" (based on force balancing) properties are inherent in gear bearing epicyclical speed reducers and these ensure exceptional safety by preventing joint back drive (when the gear bearing reduction ratio is above a certain value, around 90-120:1). Gear bearings use the gear tooth tips mated against the roller bearing to lock the system axially. In addition to locking the system together this mate can perform thrust bearing functions, adding additional functionality to the mechanism. Gear bearing devices can be made to provide exceptional bearing strength in a compact package and have unique motion control properties, which enable them to perform competitive edge functions.

A gear bearing system is described in U.S. Pat. No. 6,626,792. This system utilizes a planetary gear arrangement that eliminates conventional bearings by placing a contact surface at each gear's pitch diameter. The system utilizes a one-tooth difference between input and output pinion gears. The contacting surfaces maintain proper meshing and allow the gear set to operate with minimal vibration. Reliability is also increased due to the decrease in part count and overall complexity. Also inherent to the gear bearing design is the ability to achieve a large range of gear ratios using the same mechanisms, for example, from 1:1 to 1:2000 by only changing the number of teeth of each gear. The gear bearing system in this patent includes a single roller per gear that locks the system together using the ends of the gear teeth.

Other known drive systems utilize planetary gear systems with helical planetary gears and ball bearings and that drive an output off a carrier. Harmonic drives, that operate using a wave generator, are also known. A brief description can be found in US Patent Publication No. 2006/0073922.

Regarding the field of prosthetic devices, body-powered components have been used in prosthetics for centuries and are still commonly prescribed today. Control of these systems involves coordination of gross body movements, remote from the amputation site, and generally include some type of body harness attached directly to the prosthesis. While these prostheses are generally lightweight and low-cost, they do have significant disadvantages. The body harness generally restricts the work envelope, and the amputee must be able to coordinate body motions in a synchronized manner to properly operate the terminal device. Higher level amputees are often unable to generate sufficient motion in order to properly activate the prosthesis. Achieving satisfactory grip strength is also difficult due to the mechanical limitations of currently available terminal devices and grasp patterns.

Externally powered components have been used since the late 1970s and offer some distinct advantages over body powered components. Electronic elbows can produce around 15 lbs/ft lifting power and electronic terminal devices can produce a maximum grip force of approximately 22 lbs. While offering improved performance over many body powered components, these devices are still inadequate for many tasks.

SUMMARY OF THE INVENTION

A gear bearing drive according to the present invention is a compact mechanism with the ability to operate as an actuator providing torque and as a joint providing support. This is possible because of the combination of external rotor brushless DC motor technology and gear bearing technology. It can replace traditional motor gear train assemblies with a single mechanism saving weight and space. Additionally, high absolute or incremental positional precision is inherent to the design with the addition of an encoder to the drive motor. Its compact size, high precision and joint capabilities allow it to have applications in the aerospace, space, manufacturing, transportation and other industries.

A gear bearing drive provides a bearingless joint and a high power compact actuator with large power density. The gear bearing drive utilizes a planetary gear arrangement in which an external rotor motor is integrated within an input sun gear sub-assembly. The coils of the motor are grounded to the input ring gear. The gear bearing drive uses the roller bearing surface to provide both axial and radial support to the mechanism. The roller bearing design can use a single rolling surface with its end face mated to the gear tooth end tips or it can use a two-step roller bearing that separates radial and axial support using a roller bearing surface for radial support and an extended roller to lock the system axially. The gear bearing drive that includes a two-step roller sub-assembly can also benefit from a chamfering of gear tooth tip ends to remove all loading from the gear end tooth tips. This feature moves most axial loading to below the root circle of the gear, thereby greatly increasing the joint strength of the drive.

The gear bearing drive simplifies a machine's joint assembly by eliminating extraneous support structure. And by combining the joint structure, motor, and gearing into a single compact mechanism, devices utilizing gear bearings can achieve high power density. This makes the gear bearing drive useful in a variety of applications, including robotic arms, prosthetics, powered winches, and bionics.

DESCRIPTION OF THE DRAWINGS

The invention will be more fully understood from the following detailed description taken in conjunction with the accompanying drawings in which:

FIG. 30 is a cross-sectional view of the second embodiment of the gear bearing drive;

FIG. 31 is a partial cross-sectional view of the second embodiment of the gear bearing drive;

FIG. 33B is a further isometric view of the prosthetic arm of FIG. 33a;

DETAILED DESCRIPTION OF THE INVENTION

Figure 1:
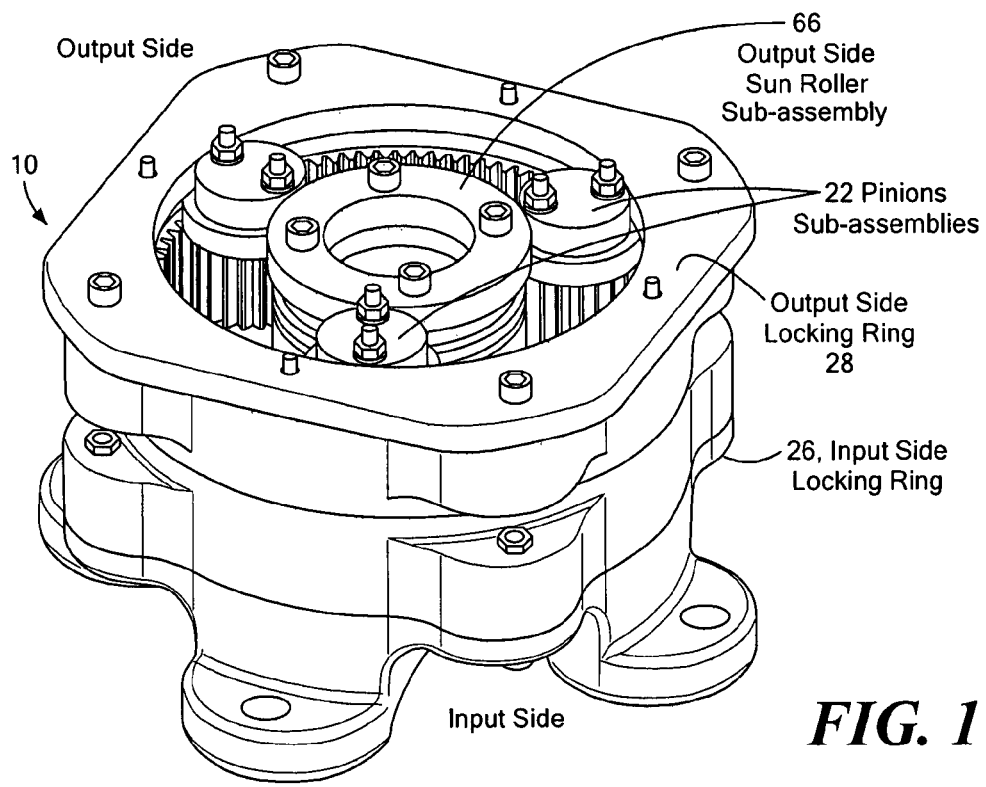
FIG. 1 is an isometric view of a first embodiment of a gear bearing drive from the output side according to the invention.
Figure 2:
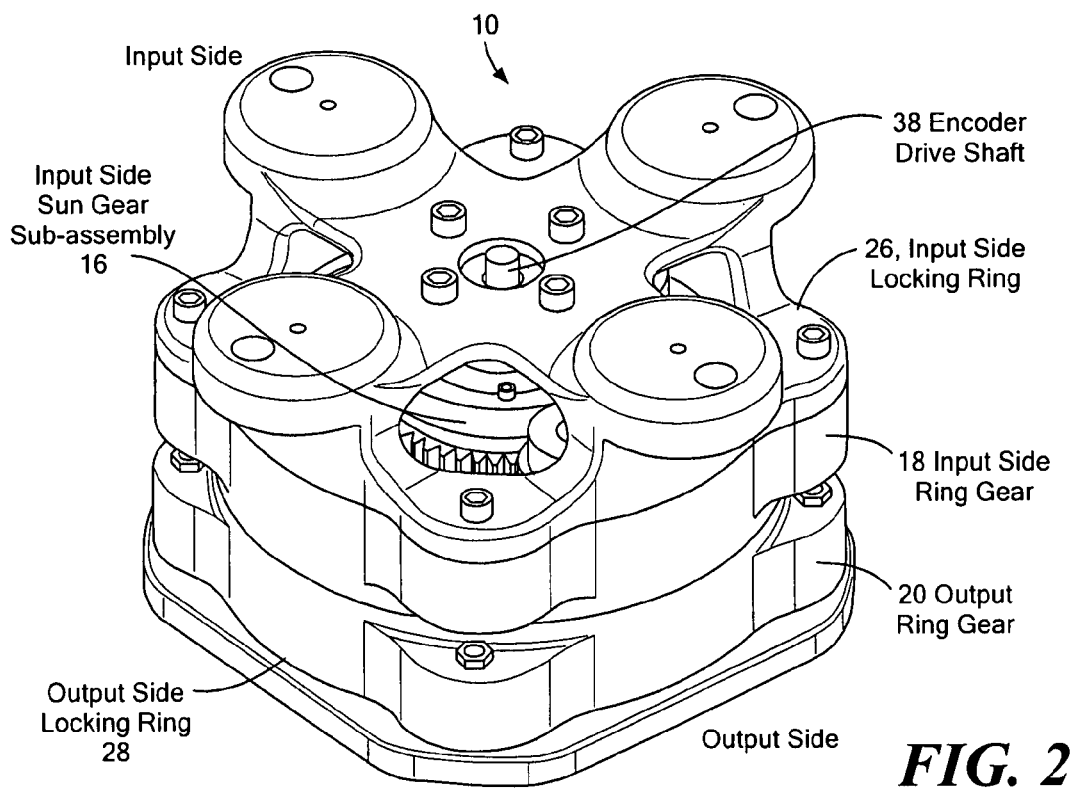
FIG. 2 is an isometric view side of the gear bearing drive of FIG. 1 from the input side.
Figure 3:
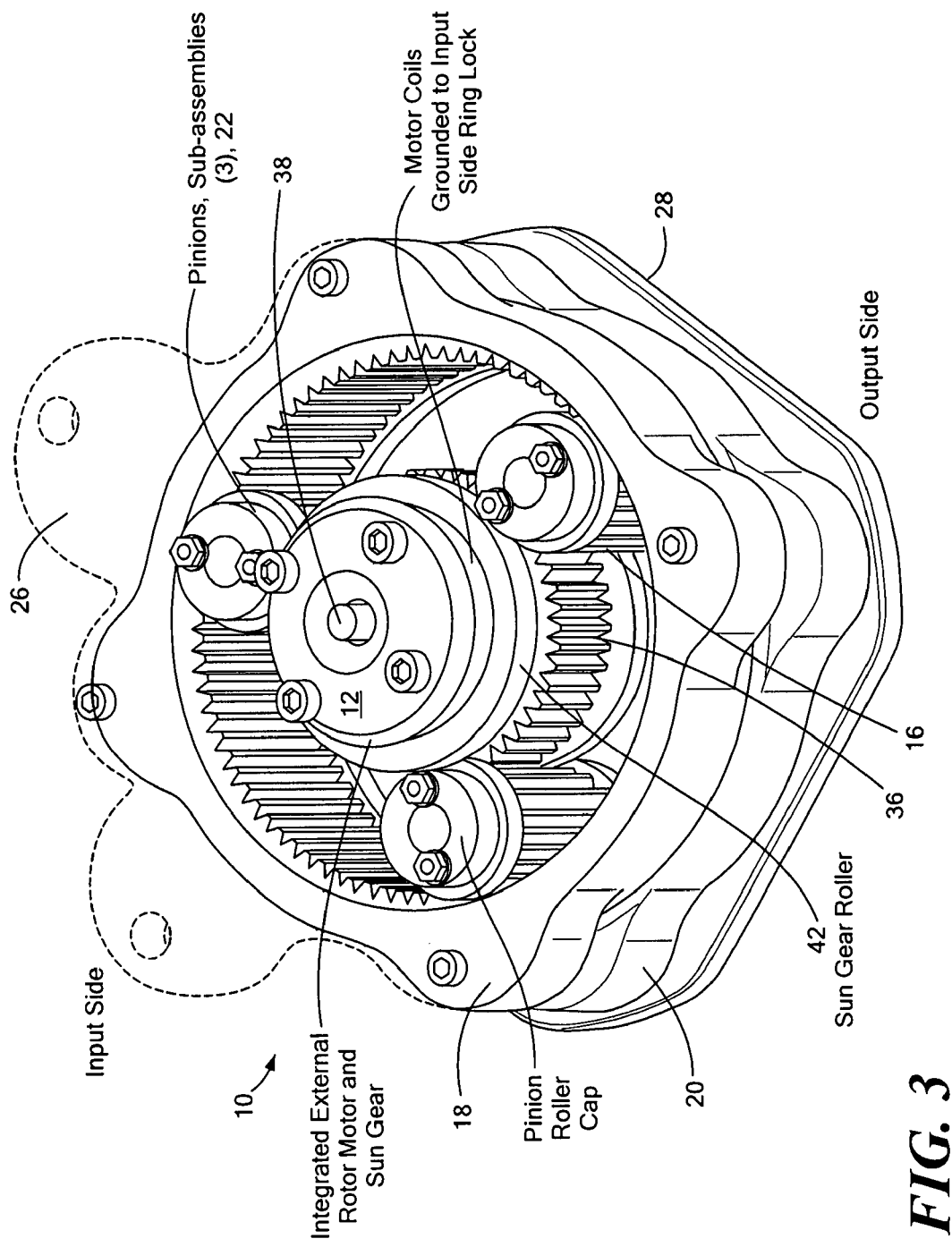
FIG. 3 is a partially cut-away view of the gear bearing drive of FIG. 2.
Figure 4:
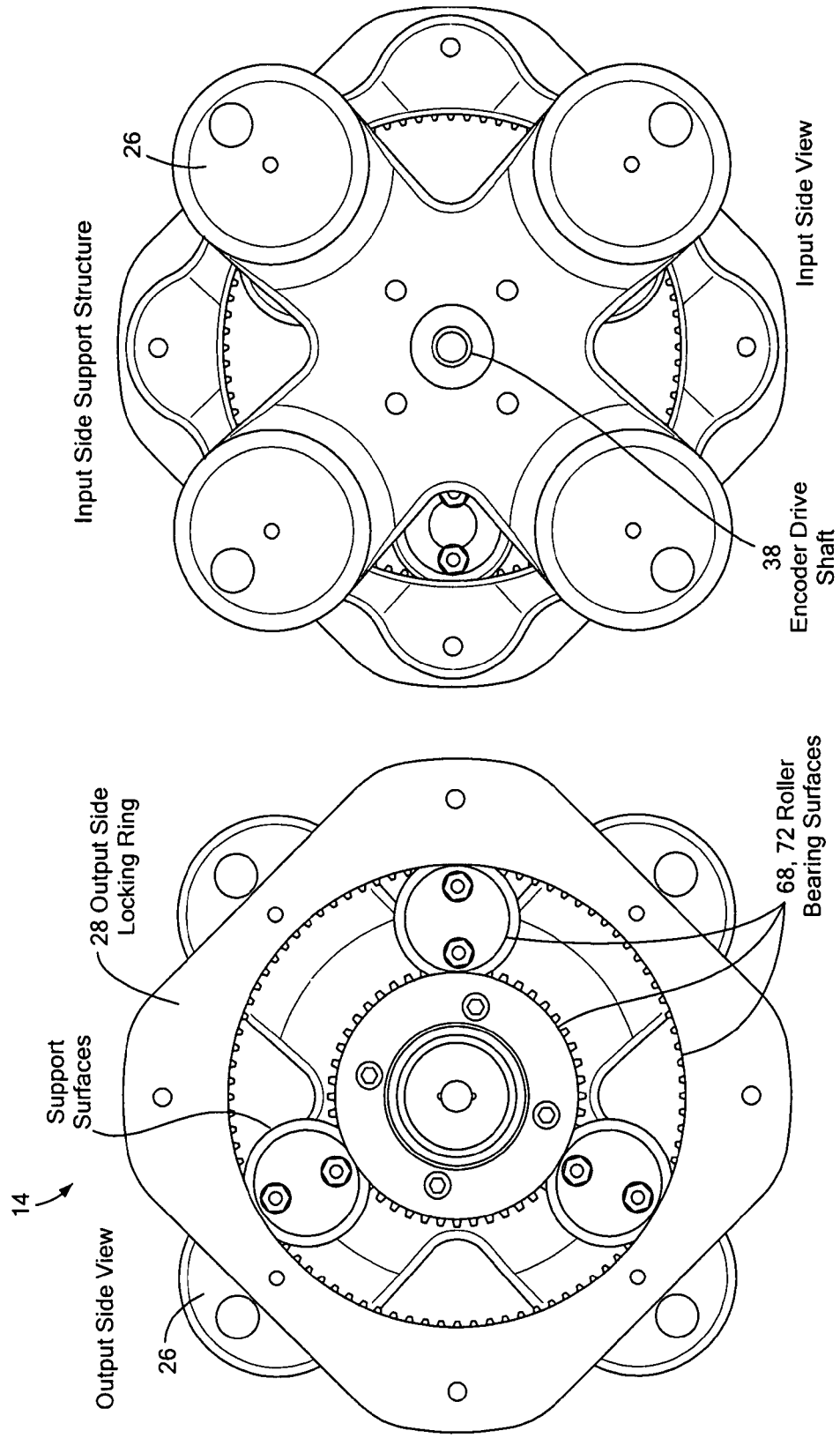
FIG. 4A is an output side plan view of the first embodiment of the gear bearing drive.
FIG. 4B is an input side plan view of the first embodiment of the gear bearing drive.
Figure 5:
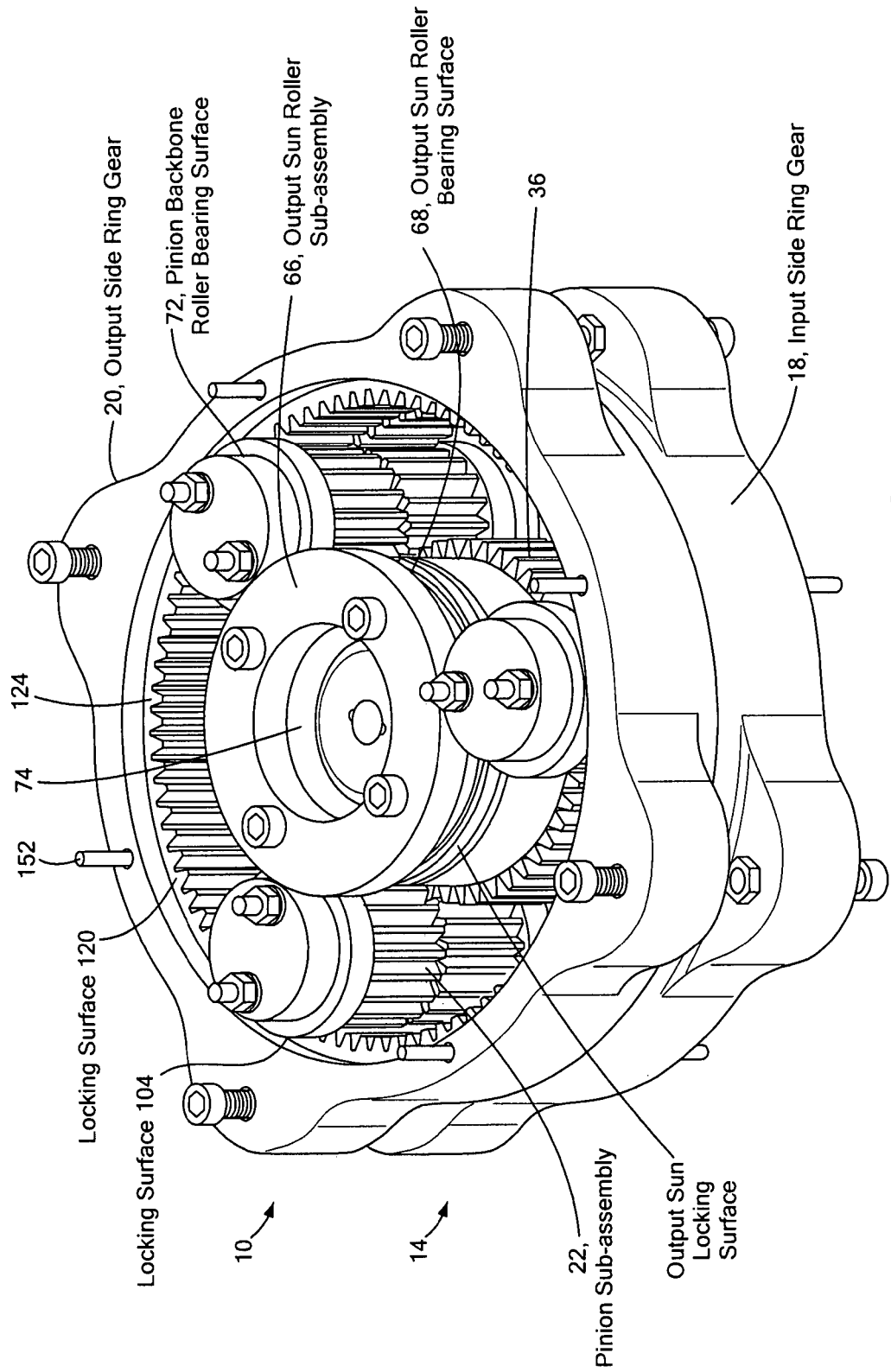
FIG. 5 is a partial view of the first embodiment of the gear bearing drive from the output side, with locking rings removed.
Figure 6:
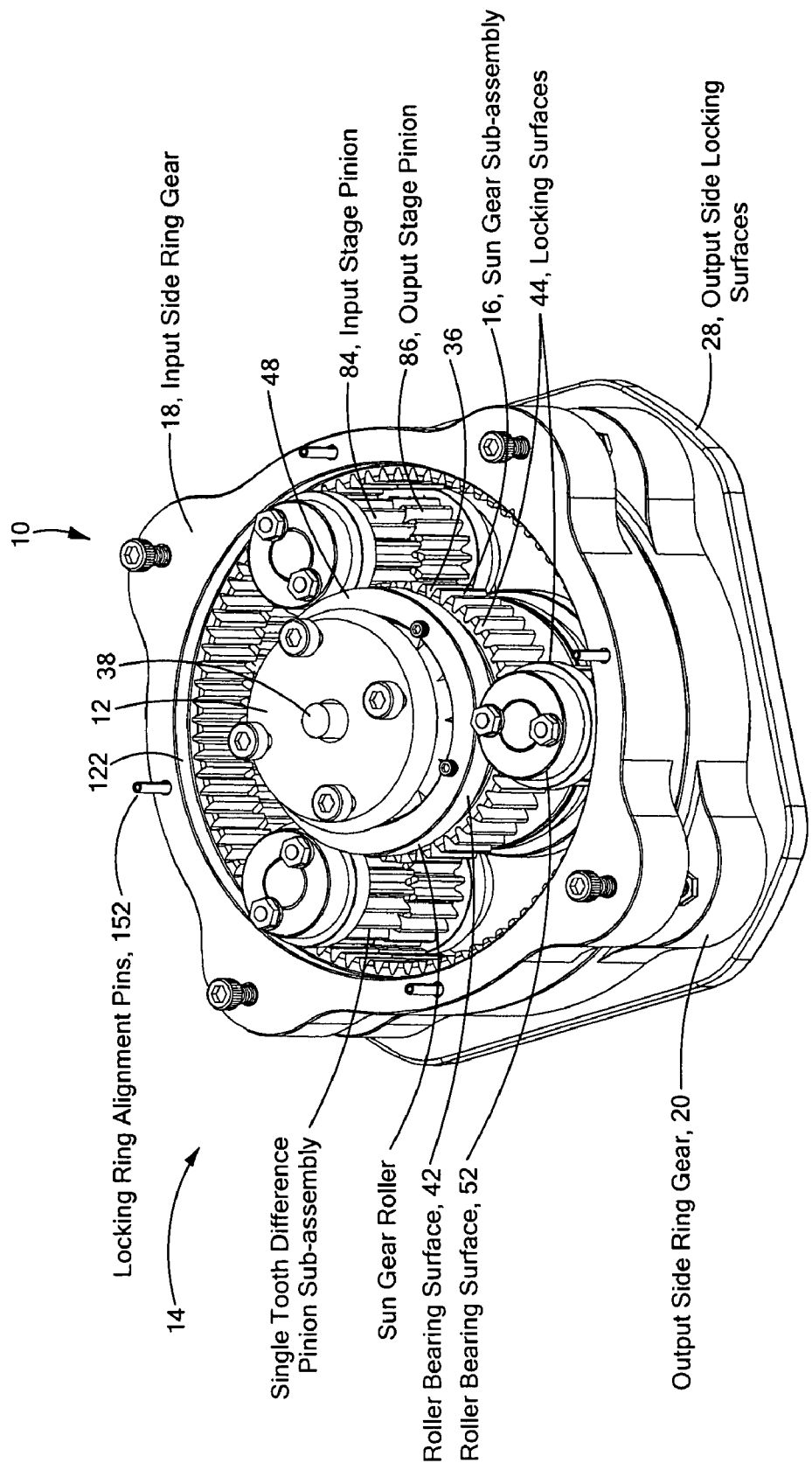
FIG. 6 is a partial view of the first embodiment of the gear bearing drive from the input side, with locking rings removed.
Figure 7:
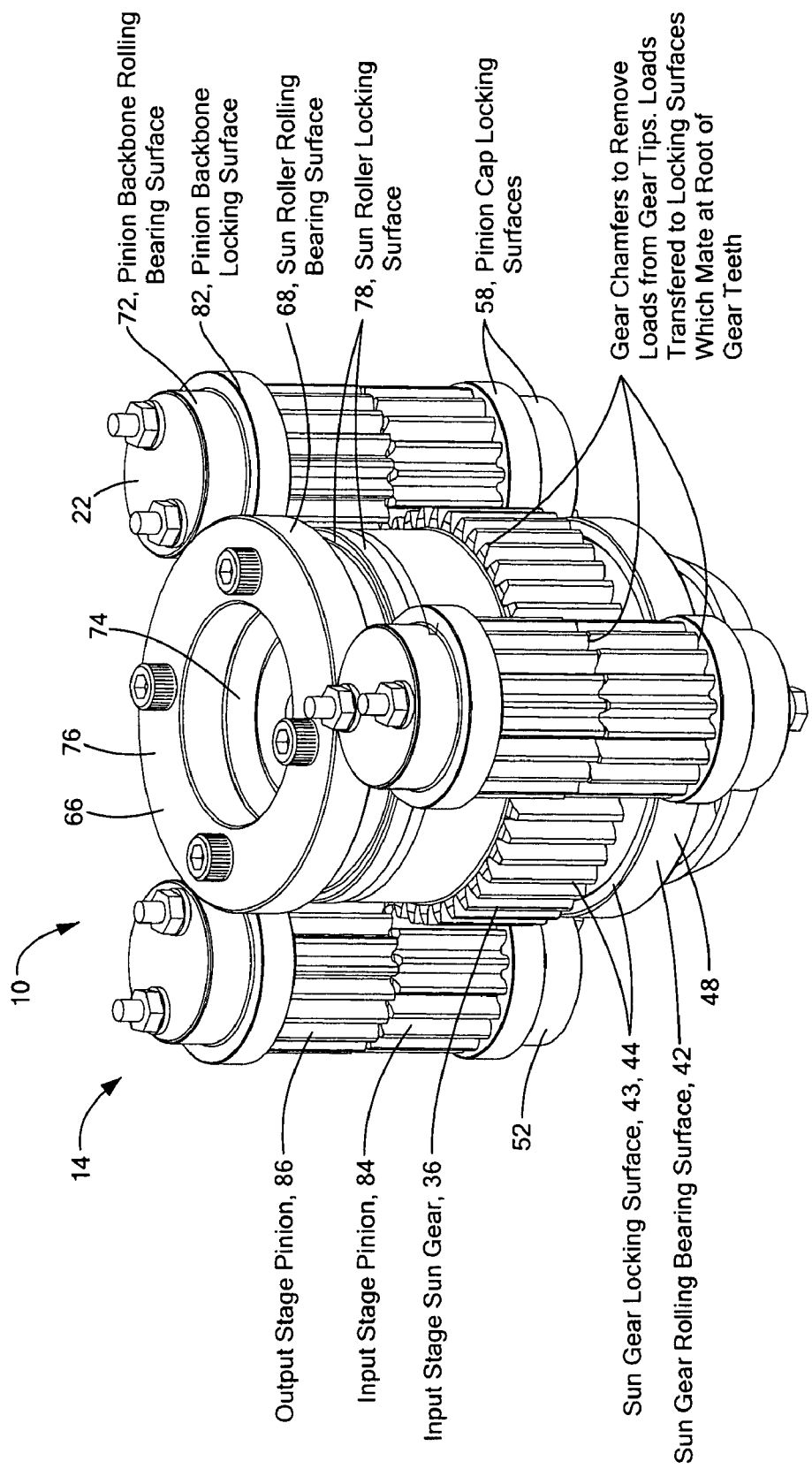
FIG. 7 is an isometric view of interior components of the first embodiment of the gear bearing drive.
Figure 8:
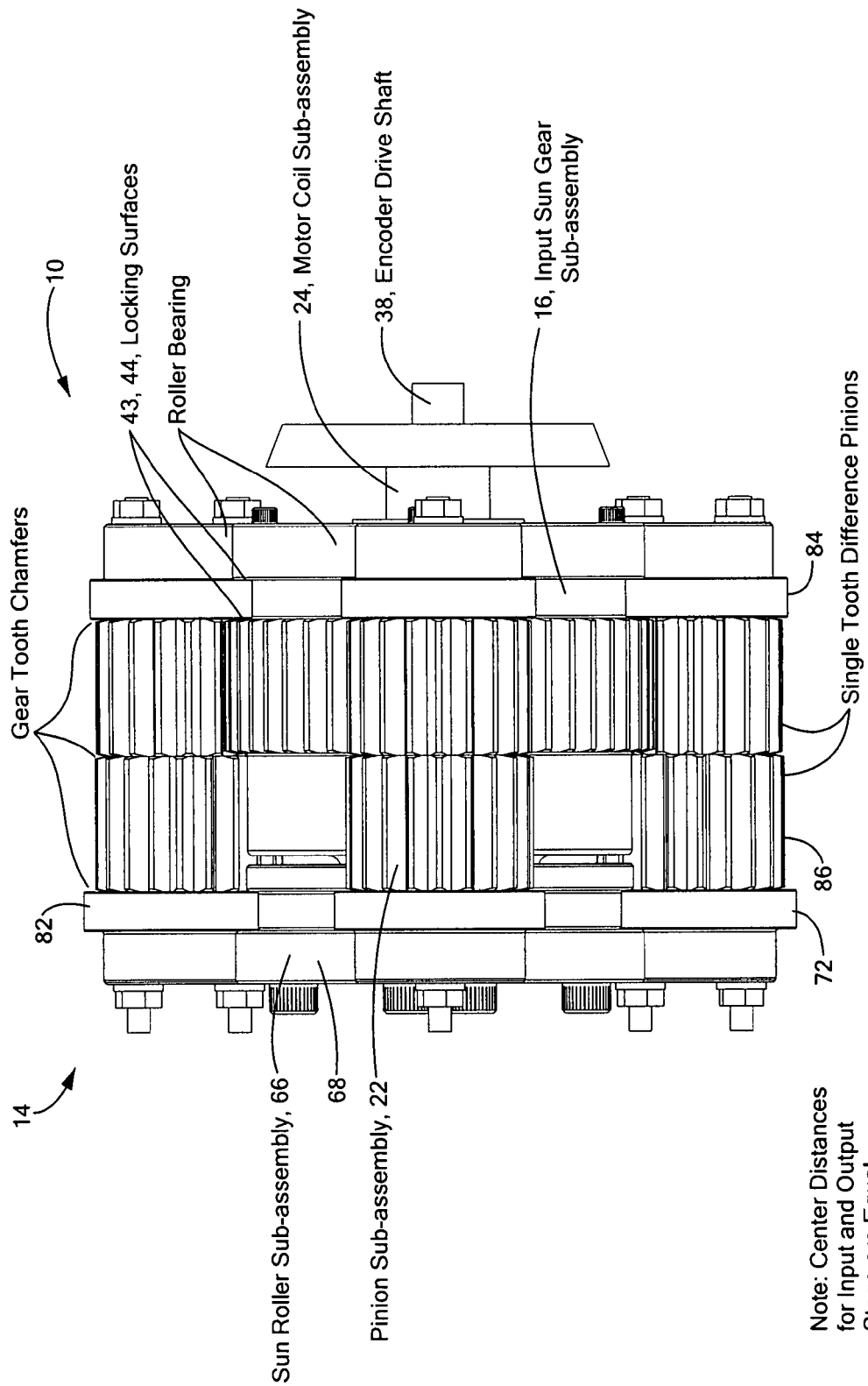
FIG. 8 is a side view of the interior components of FIG. 7.
Figure 9:
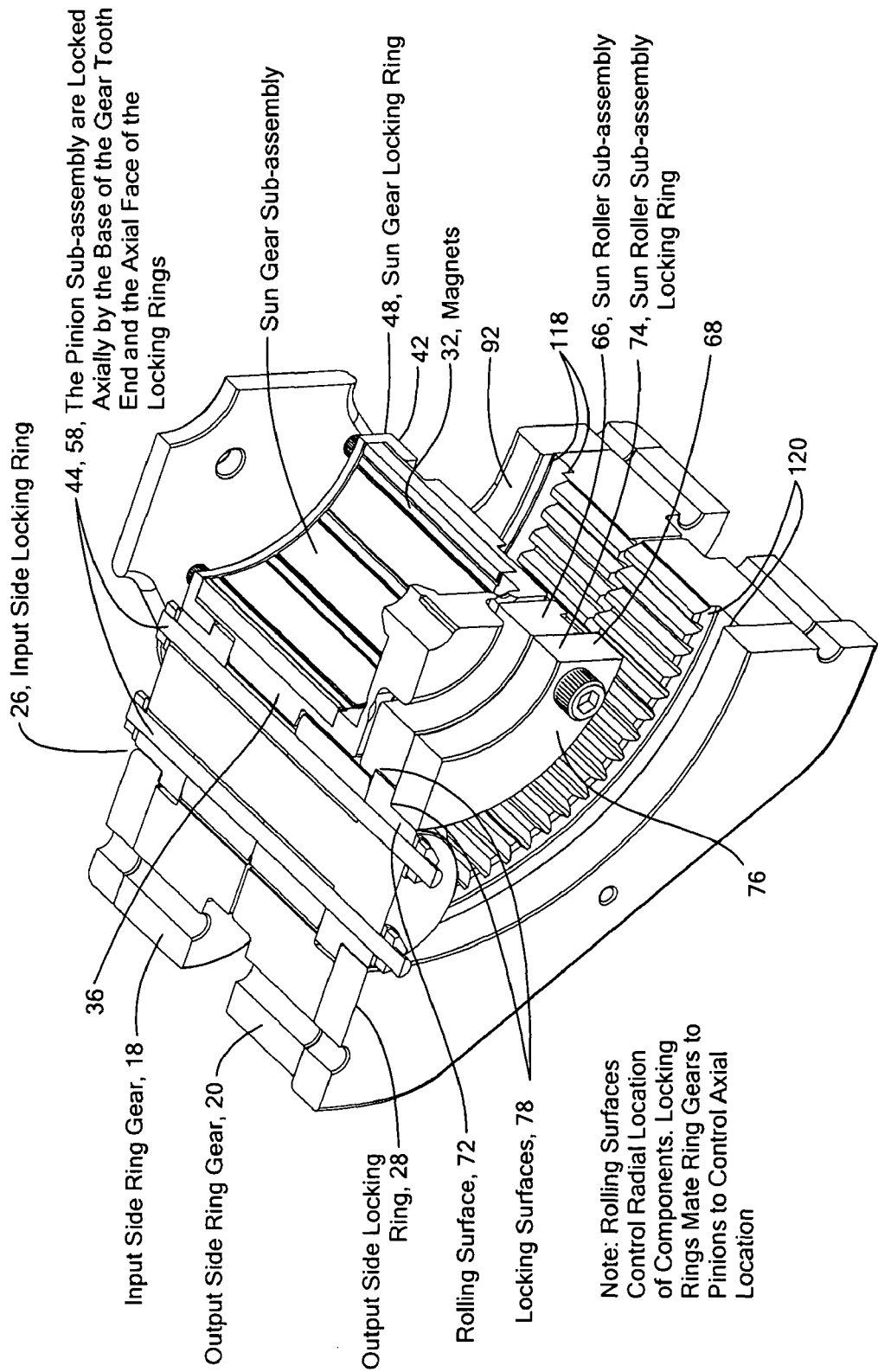
FIG. 9 is an isometric cut-away view of the first embodiment of the gear bearing drive.
Figures 10A, 10B:
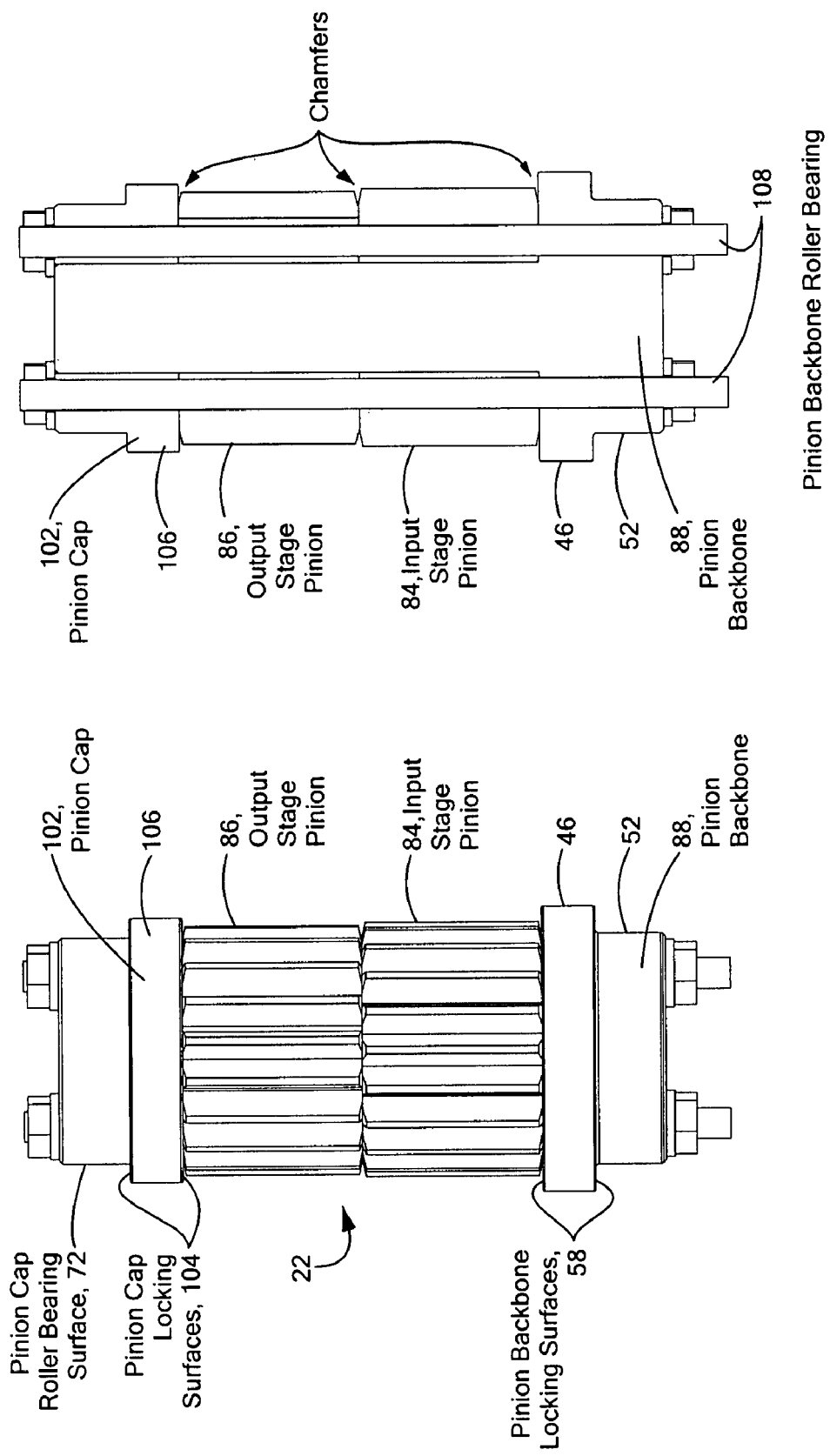
FIG. 10A is a side view of a pinion sub-assembly of the first embodiment of the gear bearing drive.
FIG. 10B is a cross-sectional view of the pinion sub-assembly of FIG. 10A.

A first embodiment of a gear bearing drive 10 of the present invention is illustrated in FIGS. 1-13. The gear bearing drive includes an external rotor motor 12 integrated into a gear bearing assembly 14. The gear bearing assembly is a bearingless gear system that places a rolling surface at the pitch diameter of each gear to maintain gearset alignment and to support thrust, radial and bending loads. More particularly, the gear system includes an input side sun gear sub-assembly 16 concentrically surrounded by input side and output side ring gears 18, 20. Several identically-sized pinion gear sub-assemblies 22 interface between the input sun gear sub-assembly 16 and the ring gears 18, 20. The pinion sub-assemblies surround and revolve about the sun gear sub-assembly to connect an input stage to an output stage of the drive. The motor 12 is integrated internally within the sun gear sub-assembly on the input side. The coils 24 of the motor are grounded to the input side of the assembly.

Input and output locking rings 26, 28 are provided on the input and output sides to mate the ring gears 18, 20 to the pinion sub-assemblies 22 and lock the entire assembly 14 together. When assembled, the drive is rigid, possessing the ability to support thrust, radial, and bending loads, as described further below. The locking rings and ring gears are configured as needed to attach to a desired application.

The sun gear sub-assembly 16 is centrally located in the interior of the drive and includes the magnets 32 of the external rotor motor and their mounting structure 34, an input sun gear 36, an optional encoder drive shaft 38, the sun gear roller bearing surface 42, and the sun gear locking surfaces 43, 44. The sun gear roller bearing surface 42 faces radially outwardly, and the sun gear locking surfaces 44 face axially to mate with an extended roller 46 of the pinion sub-assembly.

In the embodiment shown, a sun gear locking ring 48 is coaxially located on the end of the sun gear 36 at the input side. The sun gear locking ring 48 includes the sun gear roller bearing surface 42 facing radially outwardly, which rolls without slipping on a corresponding roller bearing surface 52 of the pinion sub-assemblies 22. The sun gear locking ring 48 also includes a sun gear locking surface 44 facing axially toward the sun gear 36.

Sun gear teeth 56 extend radially from the sun gear 36 at a determined pitch radius, which is the same as the radius of the sun gear roller bearing surface 42. Thus, the sun gear teeth at the pitch radius and the sun gear rolling bearing surface rotate at the same velocity. The sun gear teeth are chamfered (FIGS. 11B, 12) from the tips to the root to remove loads from the gear tip ends at the sun gear locking surface 43. Loads are transferred to locking surfaces 58 on the pinion sub-assemblies 22 that mate at the root of the gear teeth 56 and at the sun gear locking surface 44 of the locking ring 48.

Advantageously, no bearings are required to concentrically locate the sun gear, because the sun gear sub-assembly is fixed both radially and axially by the locking surfaces of the pinion sub-assemblies.

Also in the embodiment shown, an output sun roller sub-assembly 66 is coaxially disposed at the other end of the sun gear at the output side. The output sun roller assembly stabilizes the drive and keeps the pinion sub-assemblies aligned correctly. The output sun roller sub-assembly includes a sun roller bearing surface 68 facing radially outwardly, which rolls without slipping on corresponding roller bearing surfaces 72 of the pinion sub-assemblies 22.

The sun roller sub-assembly includes a sun roller locking ring 74 disposed coaxially at the end of the sun roller sub-assembly on the output side and a sun roller bearing 76. The sun roller sub-assembly includes a sun roller locking surface 78 facing axially toward the sun gear. The sun roller sub-assembly includes another locking surface 78 facing axially outwardly. The sun roller locking ring locks the sun roller sub-assembly to the pinion sub-assemblies. The locking surfaces mate with an extended roller 82 of the pinion sub-assemblies, further stabilizing the output side of the gear bearing drive.

Each pinion sub-assembly includes an input stage pinion gear 84 and an output stage pinion gear 86 coaxial with the input stage pinion gear. The teeth of the input stage pinion mesh with the teeth of the sun gear and with the teeth of the input side ring gear. The teeth of the output pinion mesh with the teeth of the output side ring gear. There is a single tooth difference between the number of teeth of the input stage pinion and the output stage pinion. Three pinion sub-assemblies are illustrated, but four or more could be used if desired, to distribute the load within the limits of the planetary gear pinion spacing equations.

The input stage pinion and the output stage pinion are coaxially mounted on a pinion support member or backbone 88, which provides the main support for the pinion sub-assembly. A pinion roller cap 102 is mounted axially at one end of the backbone on threaded rods 108 and locks the pinion sub-assembly together. The pinion sub-assembly can be assembled in another manner, as could be determined by those of skill in the art.

At the input side, the backbone includes a roller bearing surface 52 on one end facing radially outwardly. The rolling bearing surface rolls without slipping on the sun roller bearing surface 42 and the input ring gear roller bearing surface 92. This fixes the radial position of the sun gear sub-assembly. Locking surfaces 58, located on the extended roller 46 adjacent to the roller bearing surface, face axially inward and outward. They mate with the locking grooves of the sun gear sub-assembly and input ring gear, locking the input side of the gear bearing drive mechanism to the pinion sub-assembly. The tips of the gear teeth ends are chamfered to shift loading to below the root circle of the gear. This increases the force handling capabilities of the joint and decreases the potential for accelerated wear of the gear end tips.

At the output side, the backbone includes a radially facing pinion roller bearing surface 72. The roller bearing surface rolls without slipping on the sun roller bearing surface 68 and also fixes the radial position of the sun roller sub-assembly. Locking surfaces 104, located on an extended roller 106 adjacent to the roller bearing surface, face axially inward and outward. They mate with the locking grooves of the sun roller sub-assembly and output ring gear, locking the output side of the gear bearing drive mechanism to the pinion sub-assembly and axially locating the sun roller assembly. The tips of the gear teeth ends are chamfered to shift loading to below the root circle of the gear. This increases the force handling capabilities of the joint and decreases the potential for accelerated wear of the gear end tips.

The input side ring gear 18 includes teeth that mesh with the teeth of the input pinions 84. A locking groove is formed by the end faces of the input ring gear's teeth and the axial inward face of the input side locking ring 26. This groove defines locking surfaces 118 (FIG. 9) that mate with the locking surfaces 58 of the input side of the pinion sub-assembly. As with the pinion sub-assembly gear teeth and the sun gear teeth, the input side ring gear end tips are chamfered.

The output side ring gear 20 includes teeth that mesh with the teeth of the output side pinion gears 86. A locking groove is formed by the end faces of the output ring gear's teeth and the axial inward face of the output side locking ring 28. This groove defines locking surfaces 120 (FIG. 9) that mate with the locking surfaces 104 of the output side of the pinion sub-assembly. As with the pinion sub-assembly gear teeth and the sun gear teeth, the output side ring gear end tips are chamfered.

The output and input side locking rings mate the ring gears to the pinion gear sub-assemblies, locking the assembly together. The locking rings include roller bearing surfaces 122, 124 that roll without slipping on the roller bearing surfaces of the pinion roller caps and the pinion backbones.

The motor is a compact external rotor DC motor. In this motor, the coils are fixed to the end bell (grounded stator) and the magnets are placed on the rotor. This motor design has higher torque output, greater heat dissipation, and a lower part count when compared to standard DC motor designs.

Figure 11A:
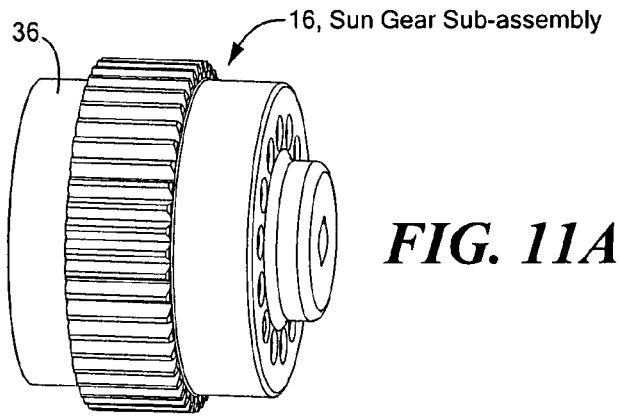
FIG. 11A is an isometric view of a sun gear sub-assembly of the first embodiment of the gear bearing drive.
Figure 11B:
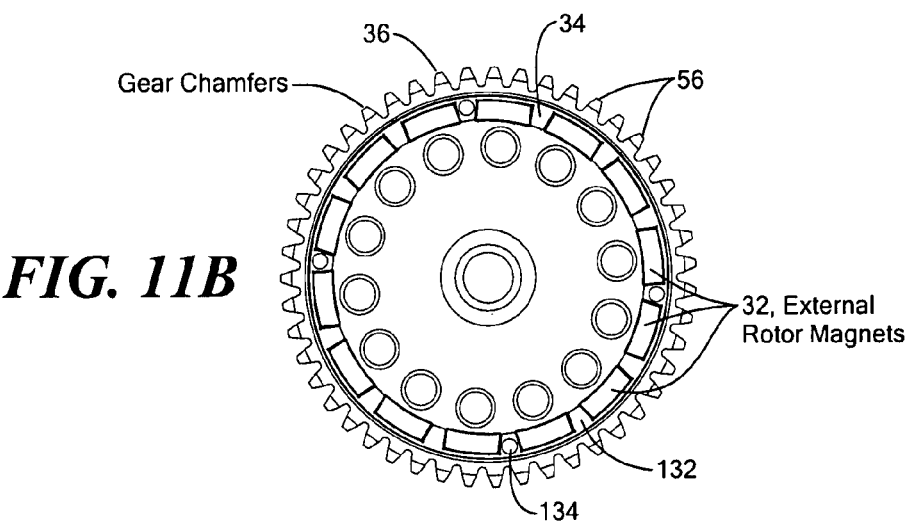
FIG. 11B is an end view of the sun gear sub-assembly of FIG. 11A.
Figure 11C:
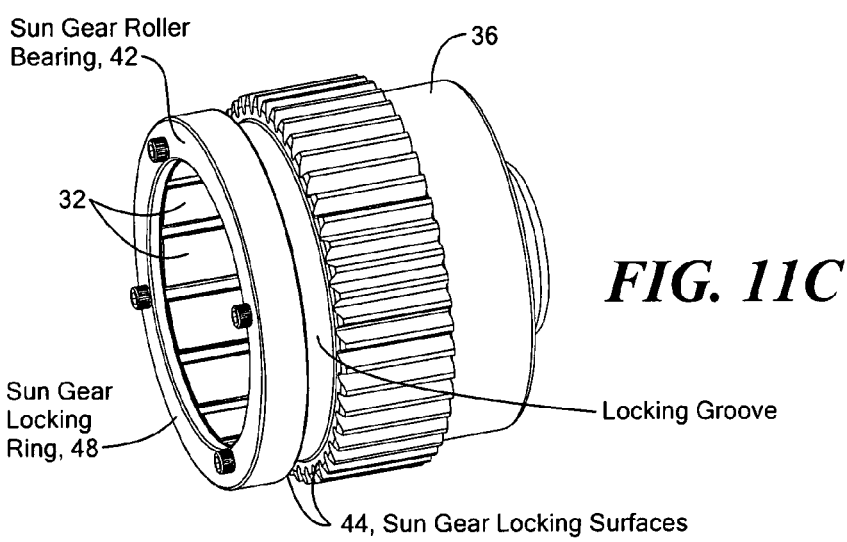
FIG. 11C is a further isometric view of the sun gear sub-assembly of FIG. 11A.
Figure 12:
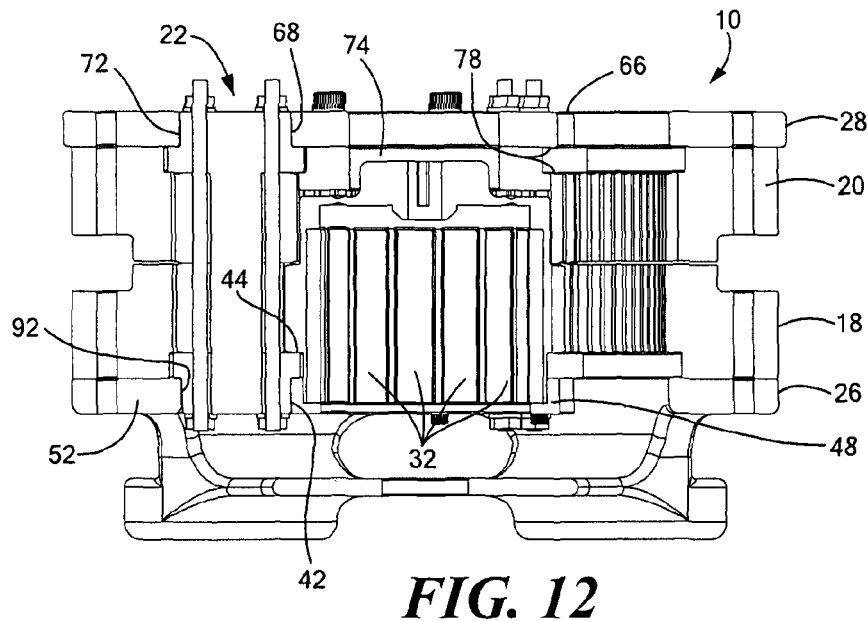
FIG. 12 is a cross-sectional view of the first embodiment of the gear bearing drive.
Figure 13:
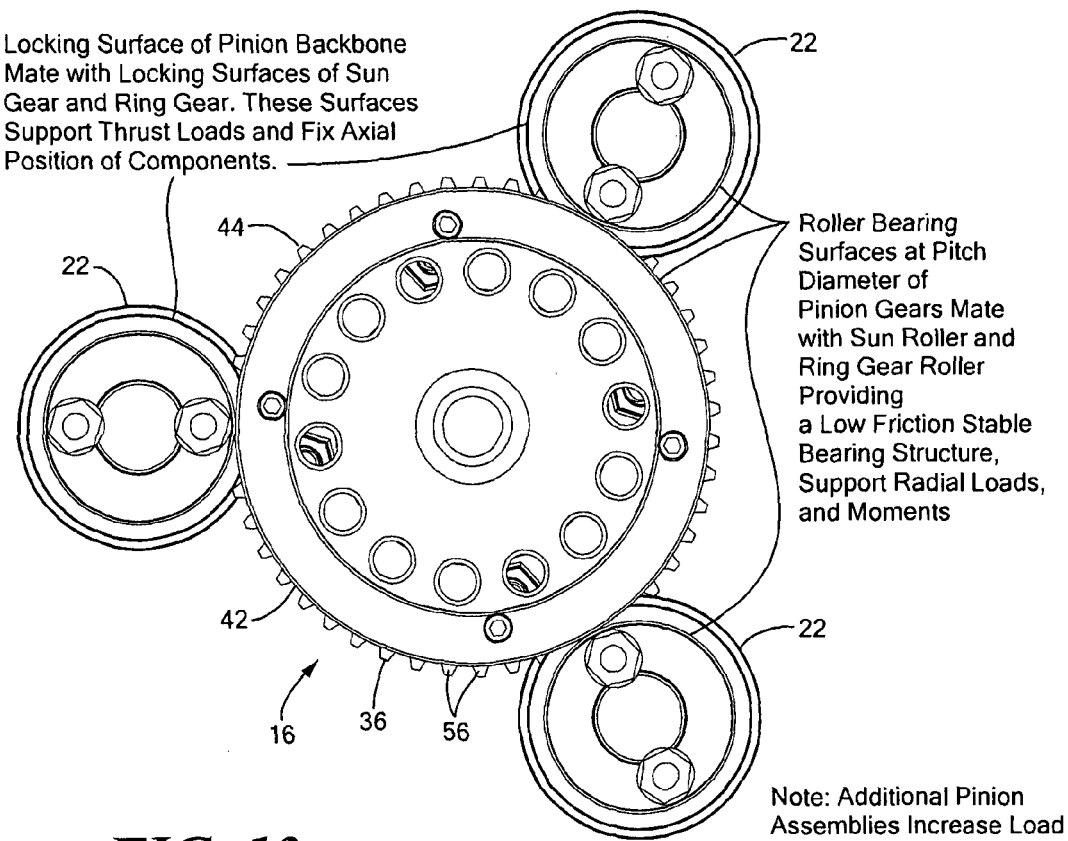
FIG. 13 is a plan view of the sun gear sub-assembly and pinion sub-assemblies of the first embodiment of the gear bearing drive.
Figure 14:
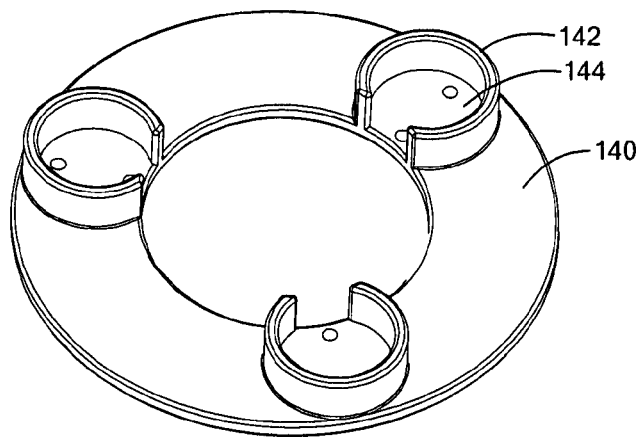
FIG. 14 is an isometric view of a first step in assembling the first embodiment of the gear bearing drive.

Referring to FIGS. 11A-C, one embodiment of the integration of the motor into the sun gear is shown. Tabs 132 are formed, for example, by machining, into an inner surface of the sun gear. The magnets 32 are affixed, for example, with glue, between the tabs. An external rotor is coaxially disposed within the cavity inside the sun gear. The stator is fixed internally within the rotor. Small tapped holes 134 may be included in some tabs to assist in holding the sun gear locking ring 48 in place.

An encoder shaft 38 may also be included for attachment to the sun gear if desired for the application. An encoder attached to this shaft has its resolution multiplied by the same ratio as the gear bearing device, making the device well suited for precision control. For example, a 12 bit (4096 clicks per rotation) encoder attached to the motor with a gear reduction ratio of 300:1 yields a potential rotational accuracy of <0.0003 degrees.

Figure 15:
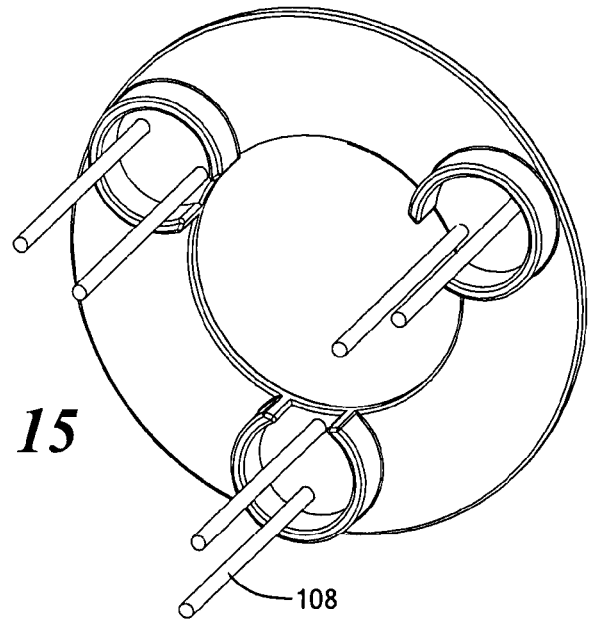
FIG. 15 is an isometric view of a second step in assembling the first embodiment of the gear bearing drive.
Figure 16:
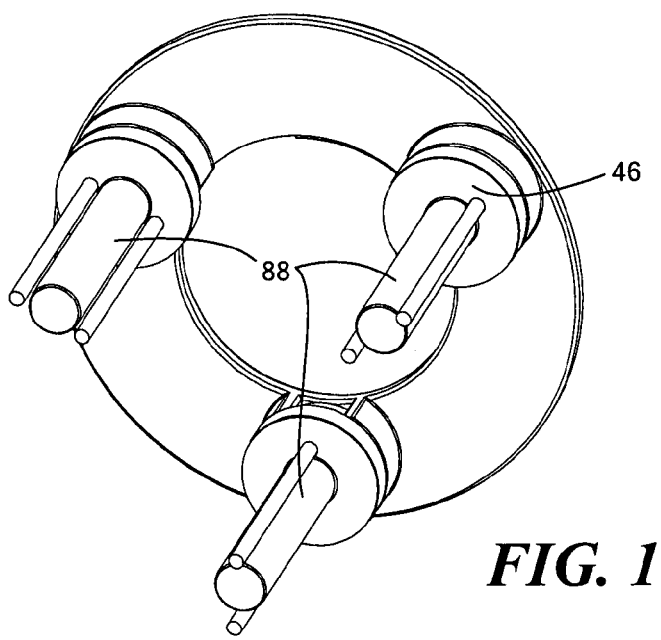
FIG. 16 is an isometric view of a third step in assembling the first embodiment of the gear bearing drive.
Figure 17:
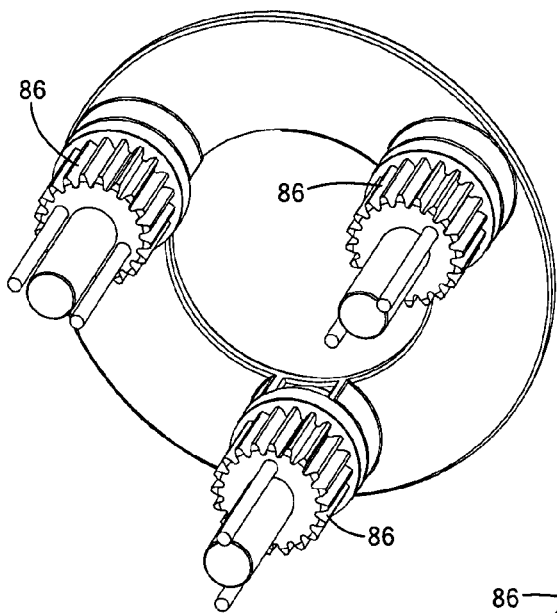
FIG. 17 is an isometric view of a fourth step in assembling the first embodiment of the gear bearing drive.

Assembly of the device is illustrated in FIGS. 14 to 28A and B. The device is preferably assembled with the aid of an assembly jig 140, which locates the pinions. In FIG. 15, the threaded rods 108 are inserted into mounting holes 144 in collars 142 in the jig. The threaded rods locate the pinions at the proper locations and orient them correctly. As seen in FIG. 16, the pinion backbones 88 are slid over the threaded rods. Next, the output stage pinions 86 are slid into place over the backbones (FIG. 17).

Figure 18:
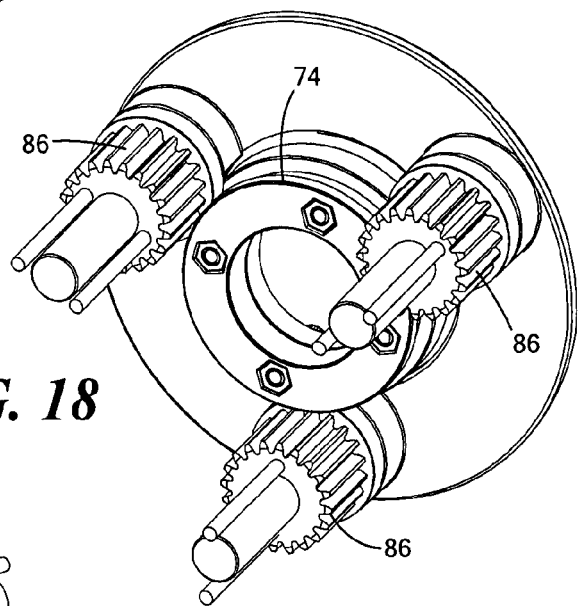
FIG. 18 is an isometric view of a fifth step in assembling the first embodiment of the gear bearing drive.
Figure 19:
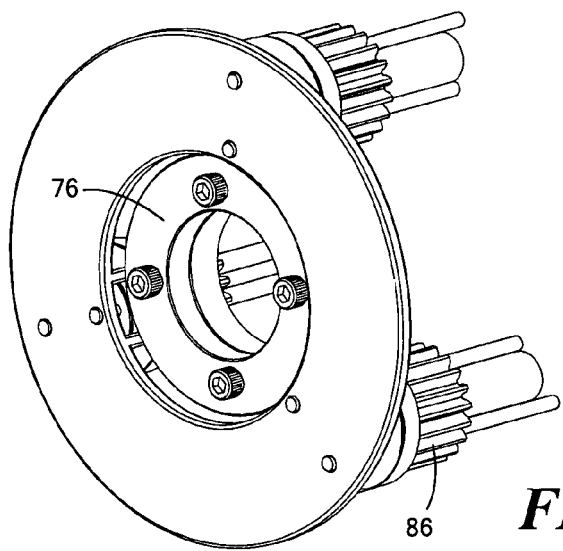
FIG. 19 is an isometric view of a sixth step in assembling the first embodiment of the gear bearing drive.
Figure 20:
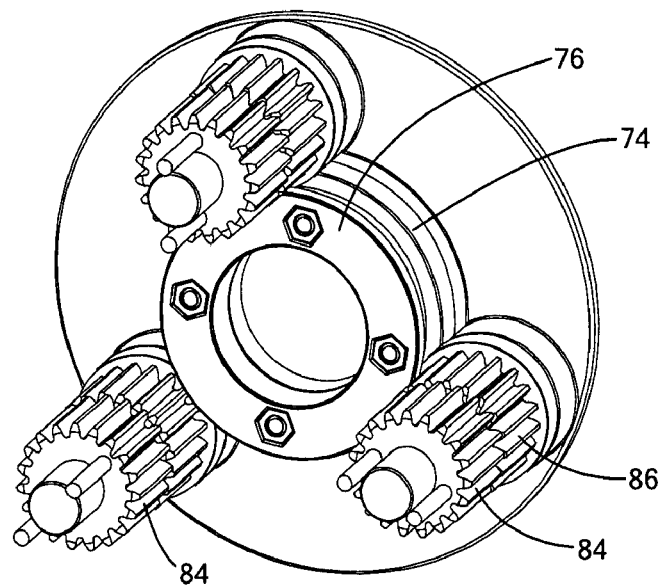
FIG. 20 is an isometric view of a seventh step in assembling the first embodiment of the gear bearing drive.
Figure 21:
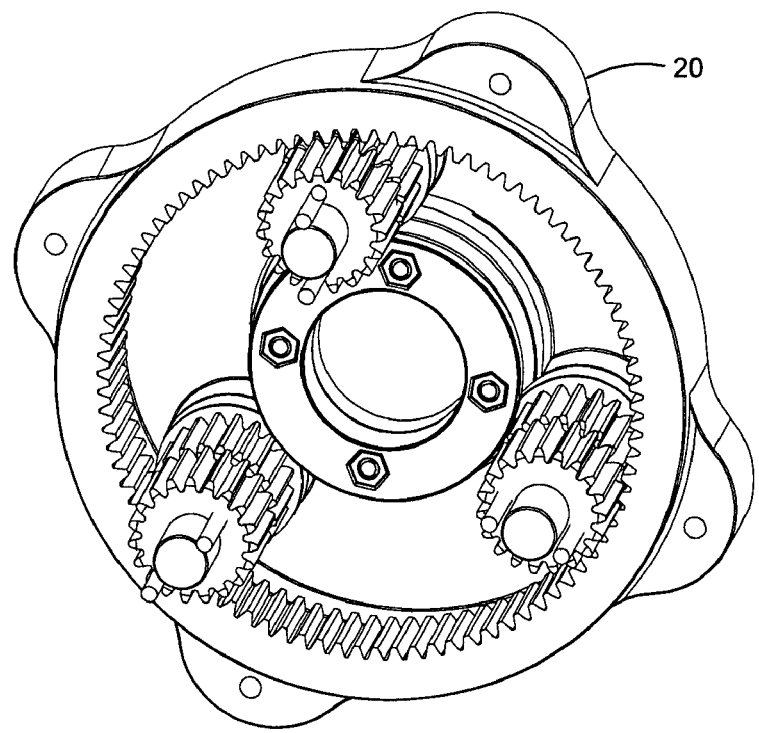
FIG. 21 is an isometric view of an eighth step in assembling the first embodiment of the gear bearing drive.
Figure 22:
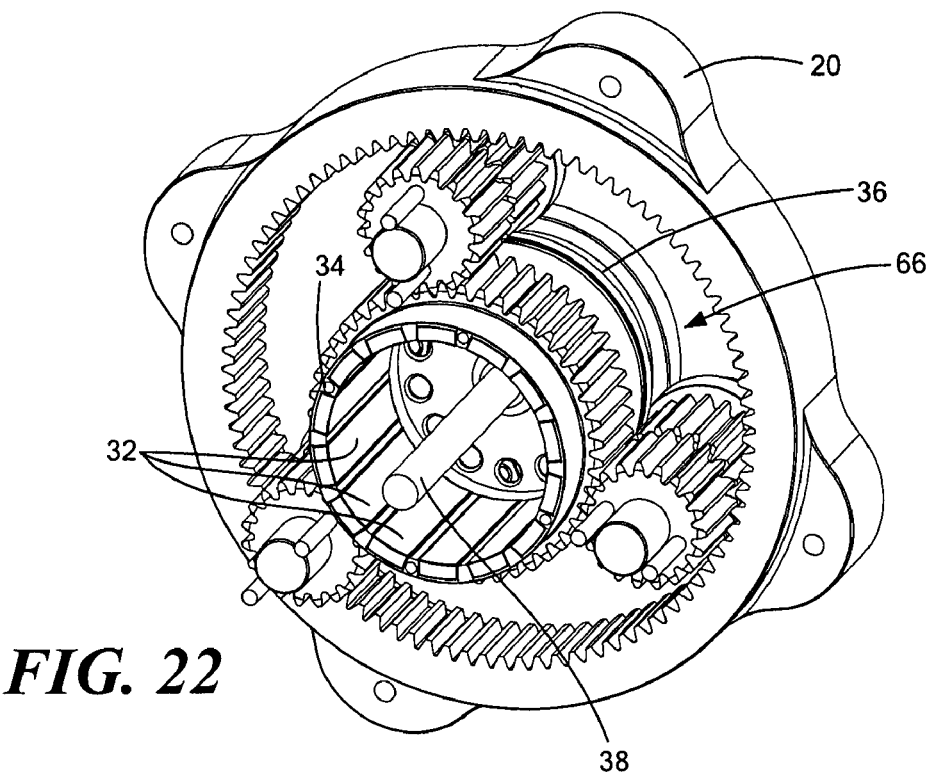
FIG. 22 is an isometric view of a ninth step in assembling the first embodiment of the gear bearing drive.

The output side sun roller locking ring 74 is held in place in the center of the jig, aligned with the opening in the jig (FIG. 18). The output sun roller 76 is then bolted to the output sun roller locking ring (FIG. 19). The input side pinions 84 are then slid on the pinion assembly backbones (FIG. 20). The output side ring gear 20 is slid in place over the pinions (FIG. 21). Next, the sun gear 36 is slid into place, and the assembly jig is removed (FIG. 22).

Figure 23:
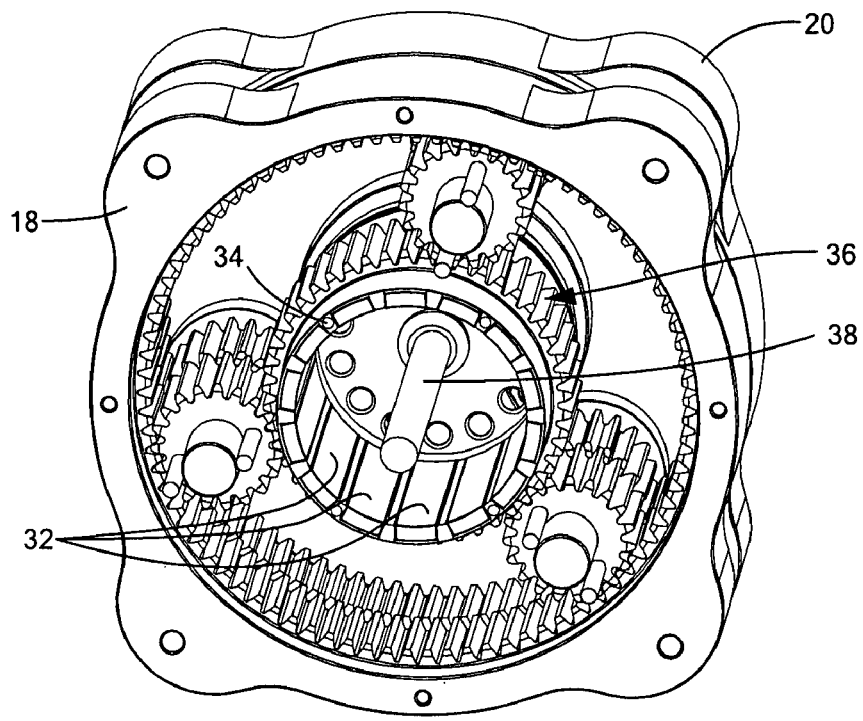
FIG. 23 is an isometric view of a tenth step in assembling the first embodiment of the gear bearing drive.
Figure 24:
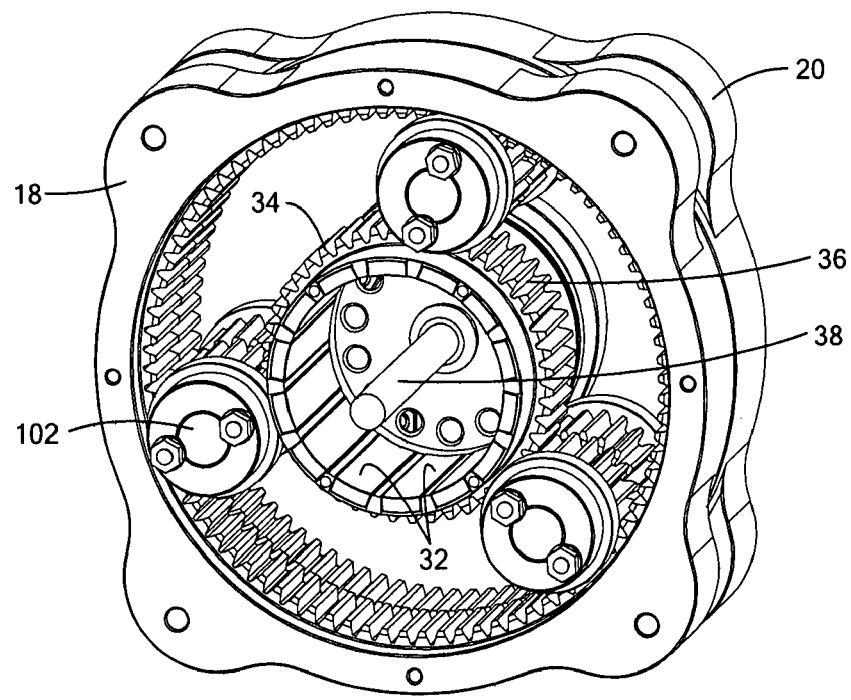
FIG. 24 is an isometric view of an eleventh step in assembling the first embodiment of the gear bearing drive.
Figure 25:
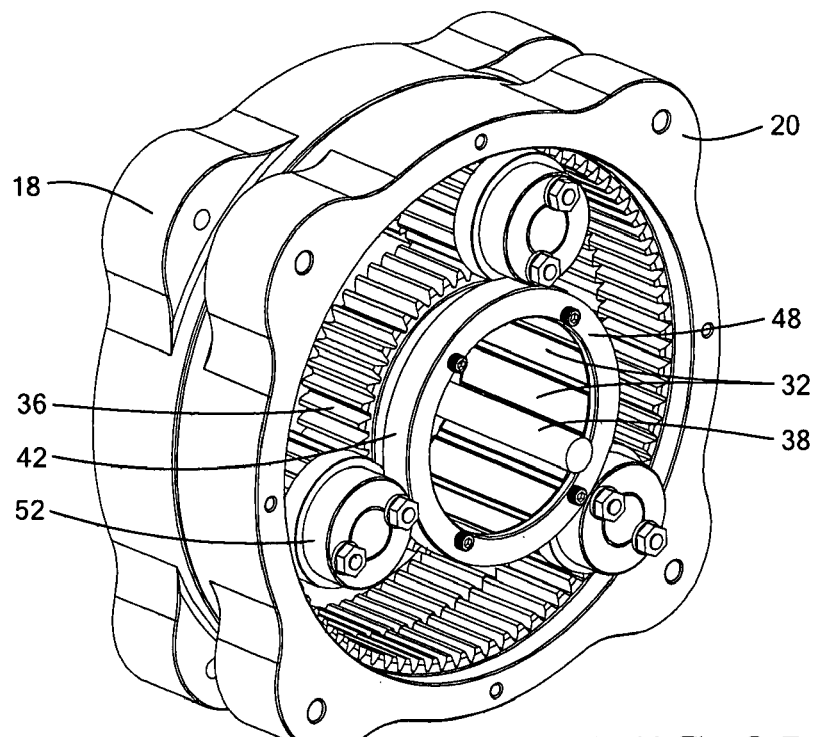
FIG. 25 is an isometric view of a twelfth step in assembling the first embodiment of the gear bearing drive.
Figure 26:
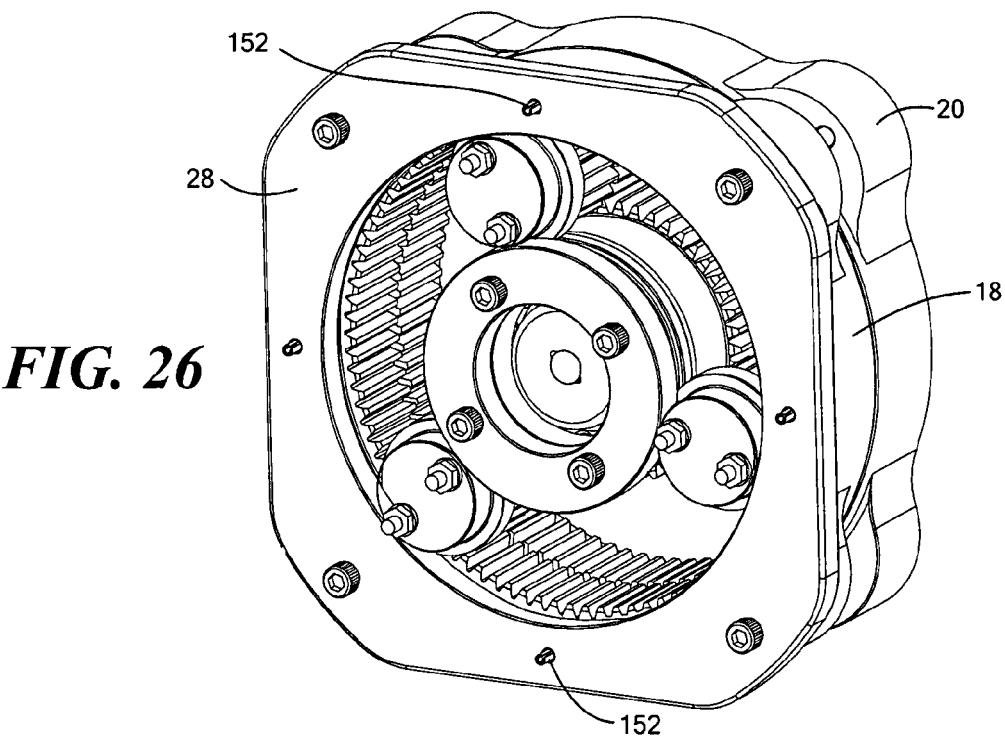
FIG. 26 is an isometric view of a thirteenth step in assembling the first embodiment of the gear bearing drive.
Figure 27:
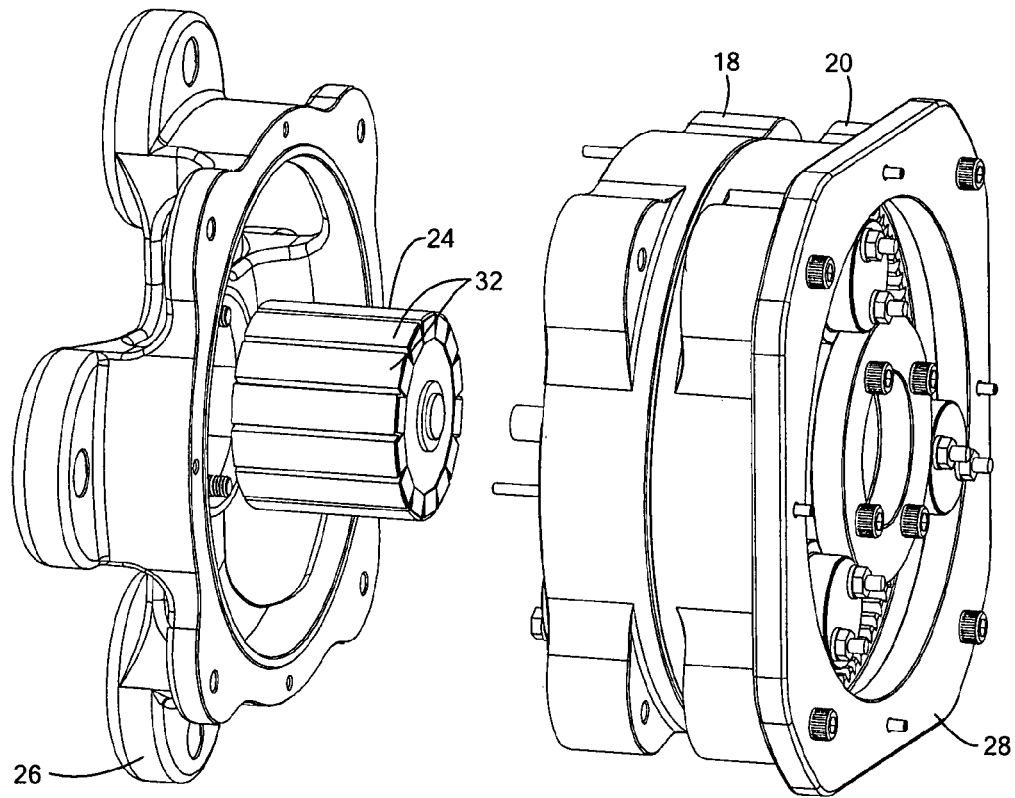
FIG. 27 is an isometric view of a fourteenth step in assembling the first embodiment of the gear bearing drive.
Figure 28A:
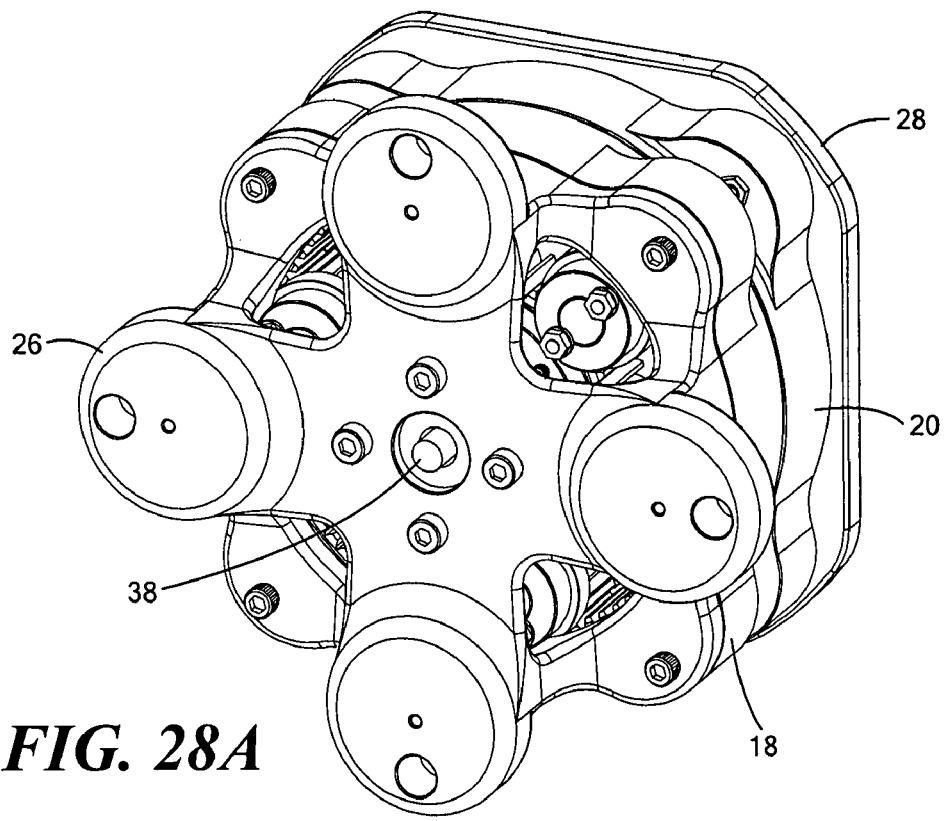
FIG. 28A is an isometric view of the first embodiment of the gear bearing drive fully assembled.
Figure 28B:
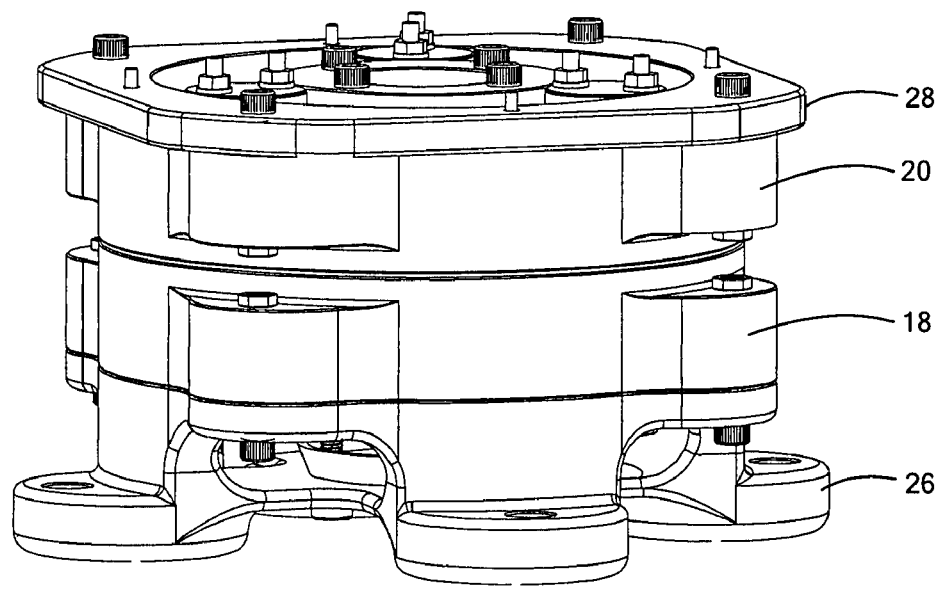
FIG. 28B is a further isometric view of the first embodiment of the gear bearing drive fully assembled.

Then the input side ring gear 18 is slid into place (FIG. 23). The pinion roller caps 102 are bolted in using the threaded rods (FIG. 24). The sun gear roller with surface 42 is slid into place and bolted down (FIG. 25). The output locking ring 28 is mounted to the output ring gear using alignment pins 152 to ensure the gear bearing roller surface is properly aligned (FIG. 26). The motor coil structure is mounted to the input side locking ring 26, and then the input side locking ring is mounted to the input side ring gear 18 (FIG. 27). FIGS. 28A and B illustrate two views of a completely assembled gear bearing drive device.

Figure 29:
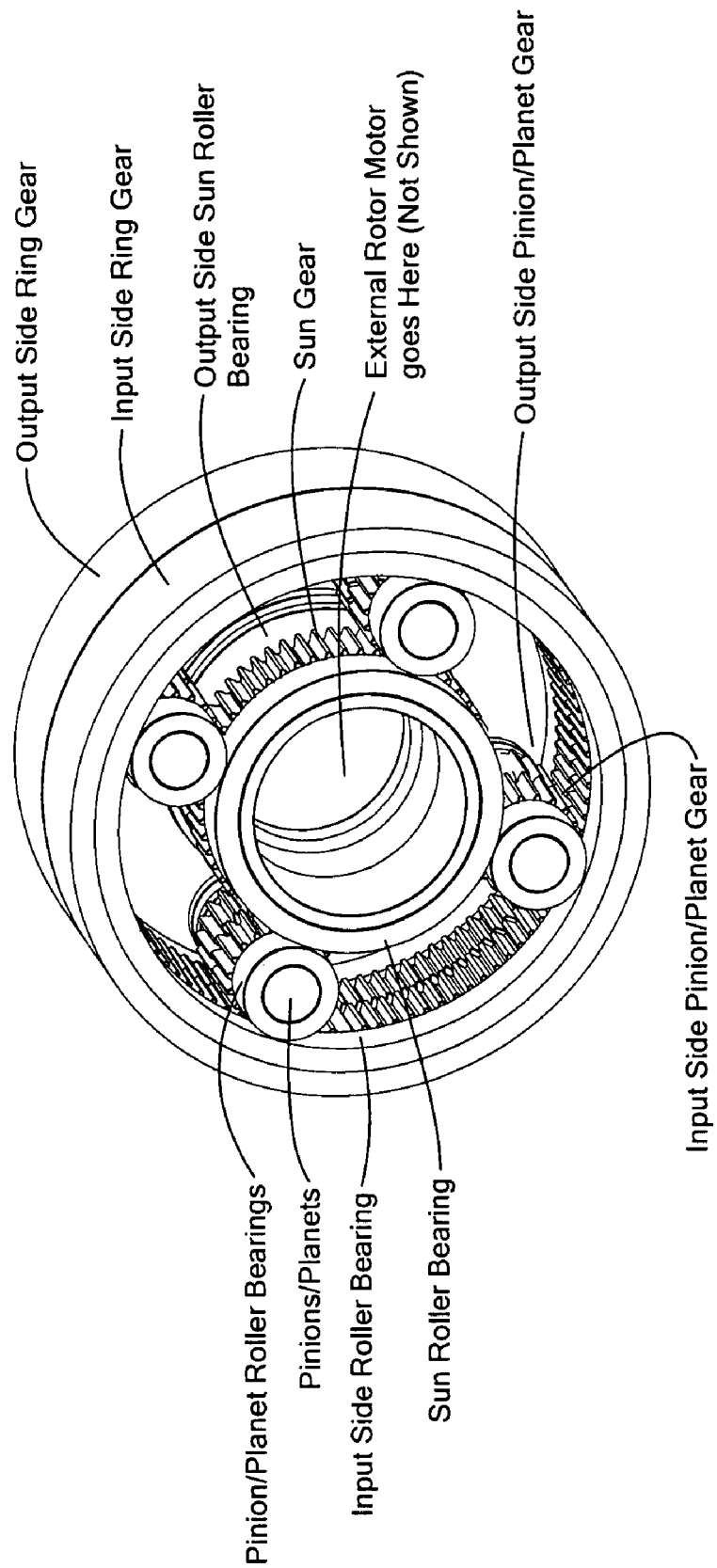
FIG. 29 is an isometric view of a second embodiment of a gear bearing drive.

Other configurations of the gear bearing drive are possible. For example, as illustrated in FIGS. 29-31, a gear bearing drive can be provided using only the gear end teeth tips and a plain gear bearing roller to lock the mechanism together. In this configuration, the roller rings are one diameter with the radial surfaces acting as gear bearing rollers and the internal axial face as locking surfaces. The input and output locking rings are omitted. The reduction ratio of the gear bearing drive is determined by known equations. (See, for example, U.S. Pat. No. 6,626,792). An external rotor motor is integrated within the sun gear as described above. Backdrivability is reduced as the gear reduction ratio increases until the point at which the "Rock Lock" takes over. After this point, the mechanism in non-backdrivable.

Figure 37:
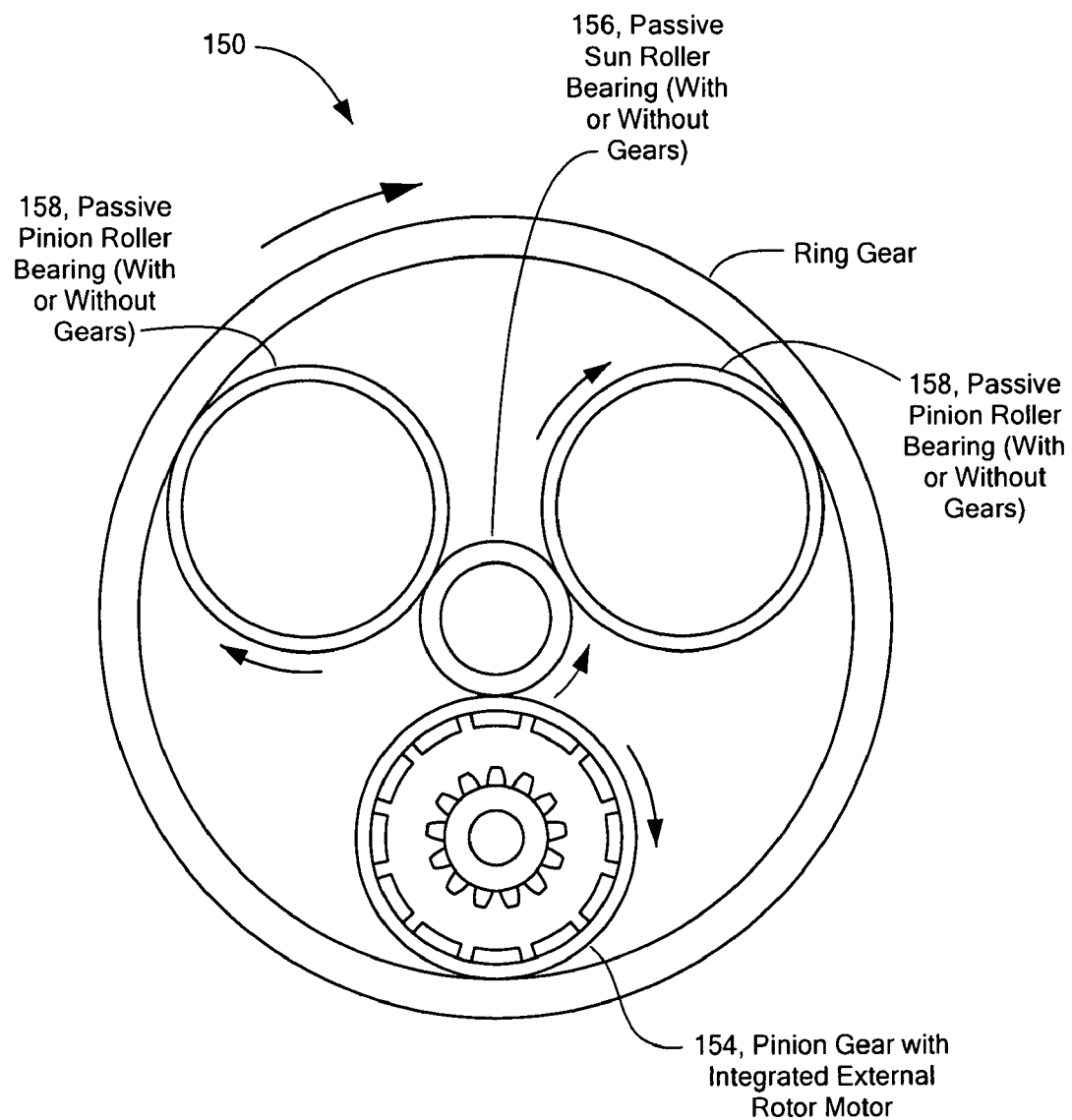
FIG. 37 is a schematic view of a further embodiment of a gear bearing drive according to the present invention.

In another embodiment of the gear bearing drive 150, an external rotor motor 152 is incorporated in one or more of the pinions 154, rather than in the sun gear 156. See FIG. 37. This assembly is thus a single stage gear reducer with an integrated motor. Additional motors increases the power density without increasing the size of the assembly. The passive centrally located sun gear 156 and the passive pinions 158 can be rollers/locking rings only, or they can also include a gear. The ring gear can drive a machine directly or can include additional features to allow it to function as the pinion component in a rack and pinion assembly. The motor stator(s) are grounded as needed depending on the applications.

Figure 38:
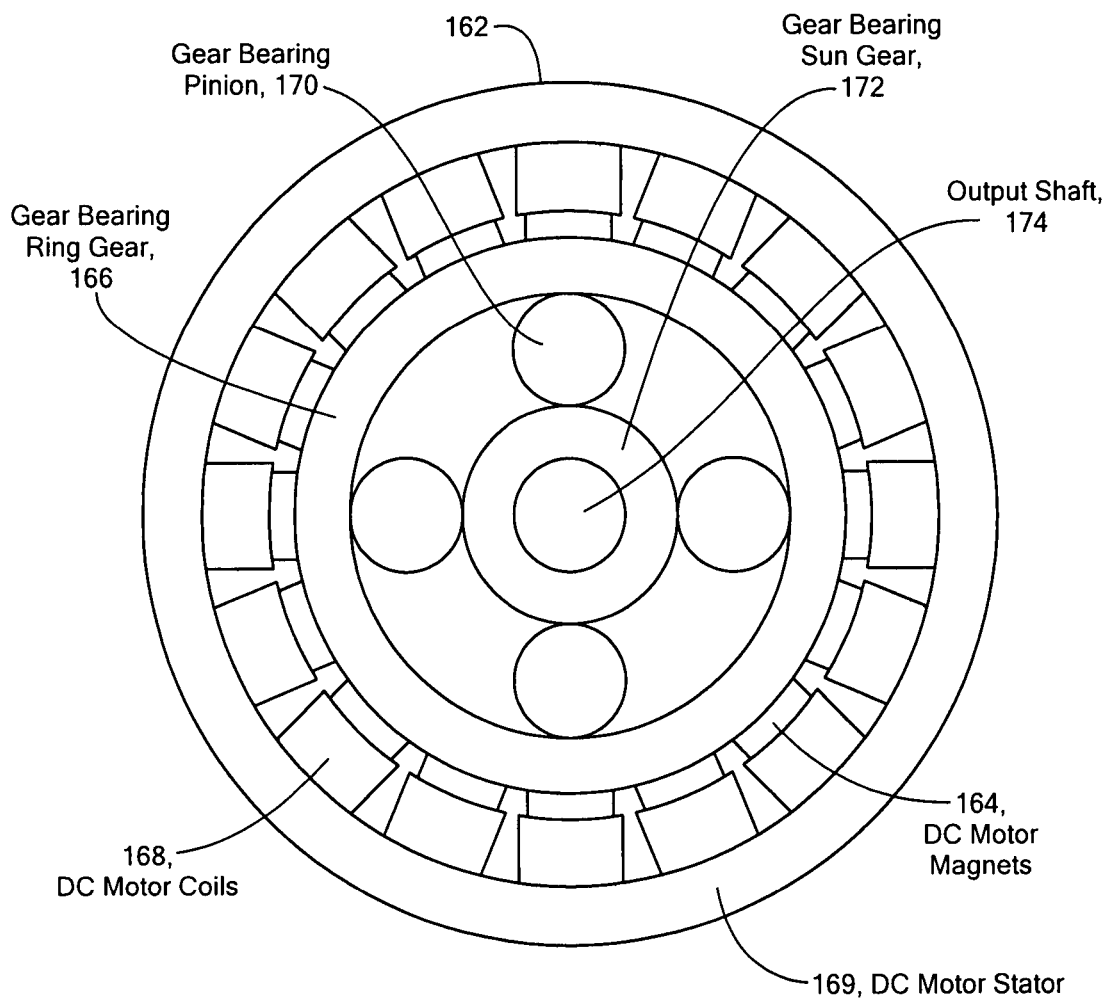
FIG. 38 is a schematic view of a still further embodiment of a gear bearing drive according to the present invention.

In a further embodiment, the gear bearing drive 160 is a gear bearing transmission integrated into an internal rotor brushless DC motor 162 coaxially. See FIG. 38. The magnets 164 are mounted to the exterior of the gear bearing ring gear 166. The motor coils 168 within the stator 169 are grounded along with the position of the pinions 170. The pinions rotate in place using standard ball bearings. The ring gear is driven and the power is transferred to the sun gear 172 via the pinions. The sun gear has an output shaft 174. The ring gear, pinion gears, and sun gear all include roller bearing surfaces. These roller bearing surfaces maintain the concentricity of the sun and ring gear with relation to the coils. The pinions support the internal structure. This configuration of the gear bearing drive multiplies the rotational speed of the output shaft in relation to the driven ring gear. The large radius of the magnet/coils gives the motor high torque capabilities. The output shaft has the ability to support loads, both thrust and radial, along with moments.

A further embodiment of this externally driven gear bearing drive uses a two stage system, with planets having a single tooth difference, and an output side ring gear and sun roller. The output side ring gear is the output of the actuator. It has the same gear bearing components as the above sun gear driven embodiment, except that the input side ring gear is now driven in a similar fashion to that of the embodiment of FIG. 38 by an internal rotor motor and exterior coils. In this case, the pinions are free to cycle and the sun gear is locked in position (grounded). It may incorporate the same type of locking groove system as described previously. This drive can support thrust and radial loads along with moments on the output side ring gear.

The gear-bearing drive can be implemented as a joint, capable of supporting moments, thrust, and radial loads while driving the joint with high levels of torque. For example, the gear bearing drive is suitable as a joint in a robotic arm or prosthetic limb.

Figure 32A:
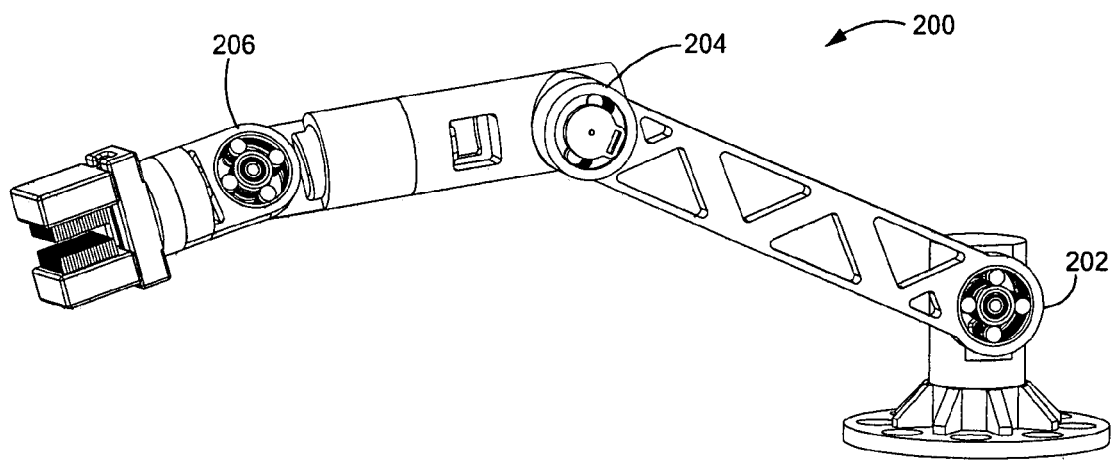
FIG. 32A is an isometric view of a robotic arm incorporating gear bearing drives according to the present invention.
Figure 32B:
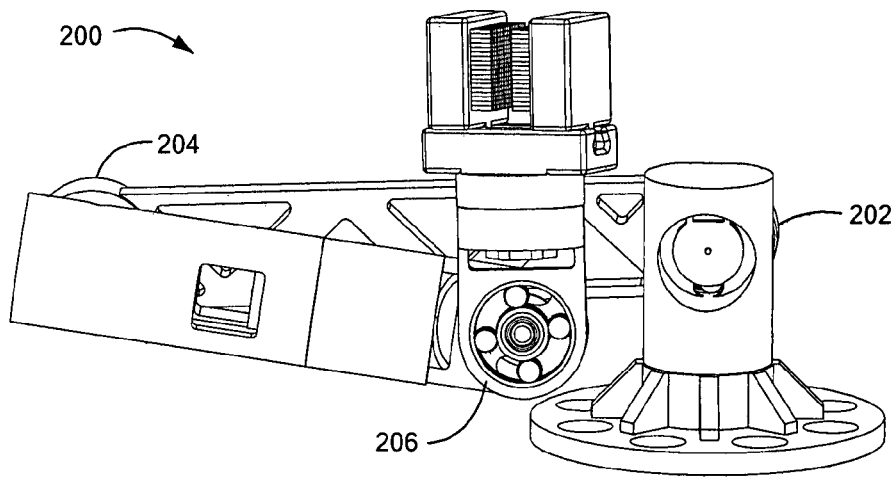
FIG. 32B is a further isometric view of the robotic arm of FIG. 32A.
Figure 32C:
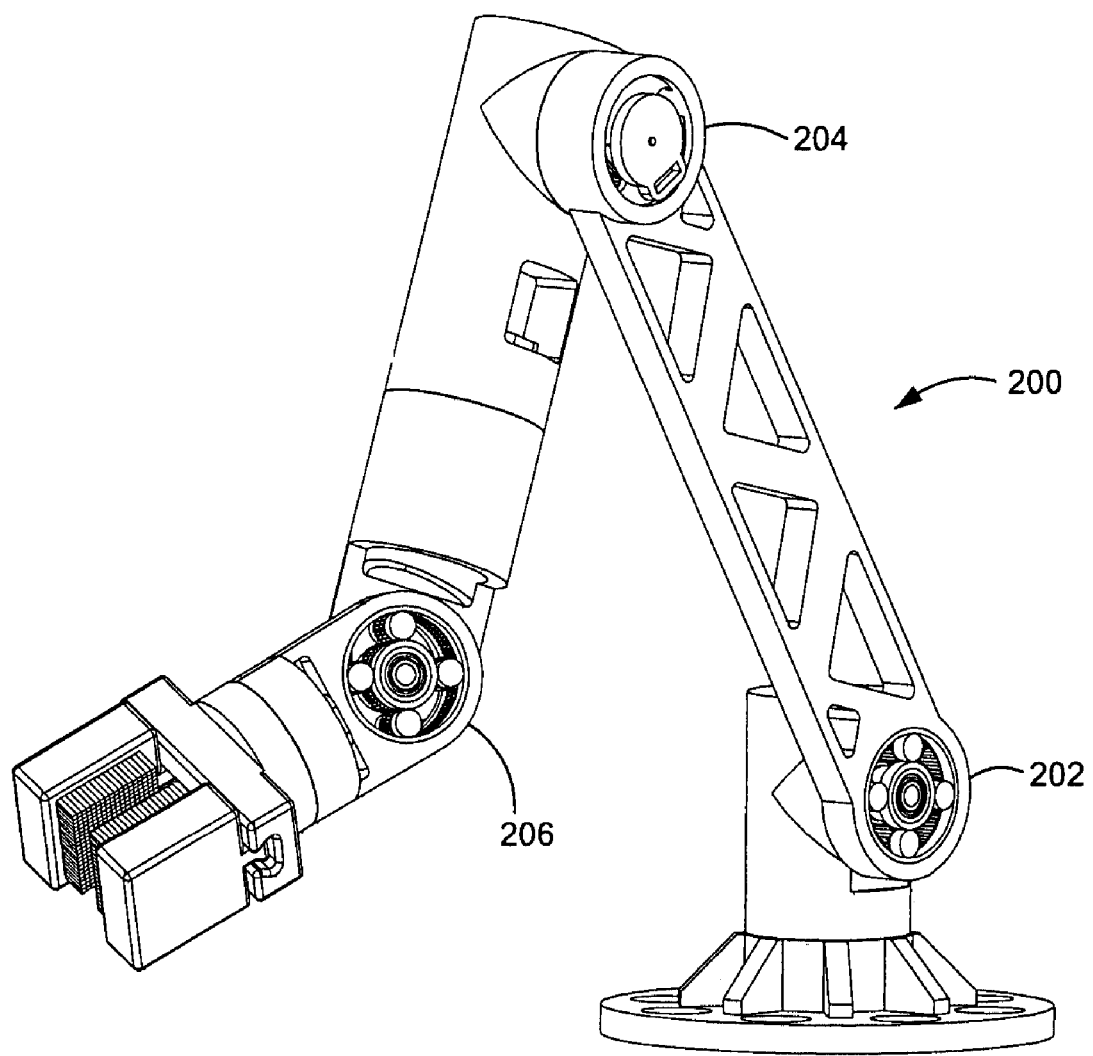
FIG. 32C is a still further isometric view of the robotic arm of FIG. 32A.
Figure 33A:
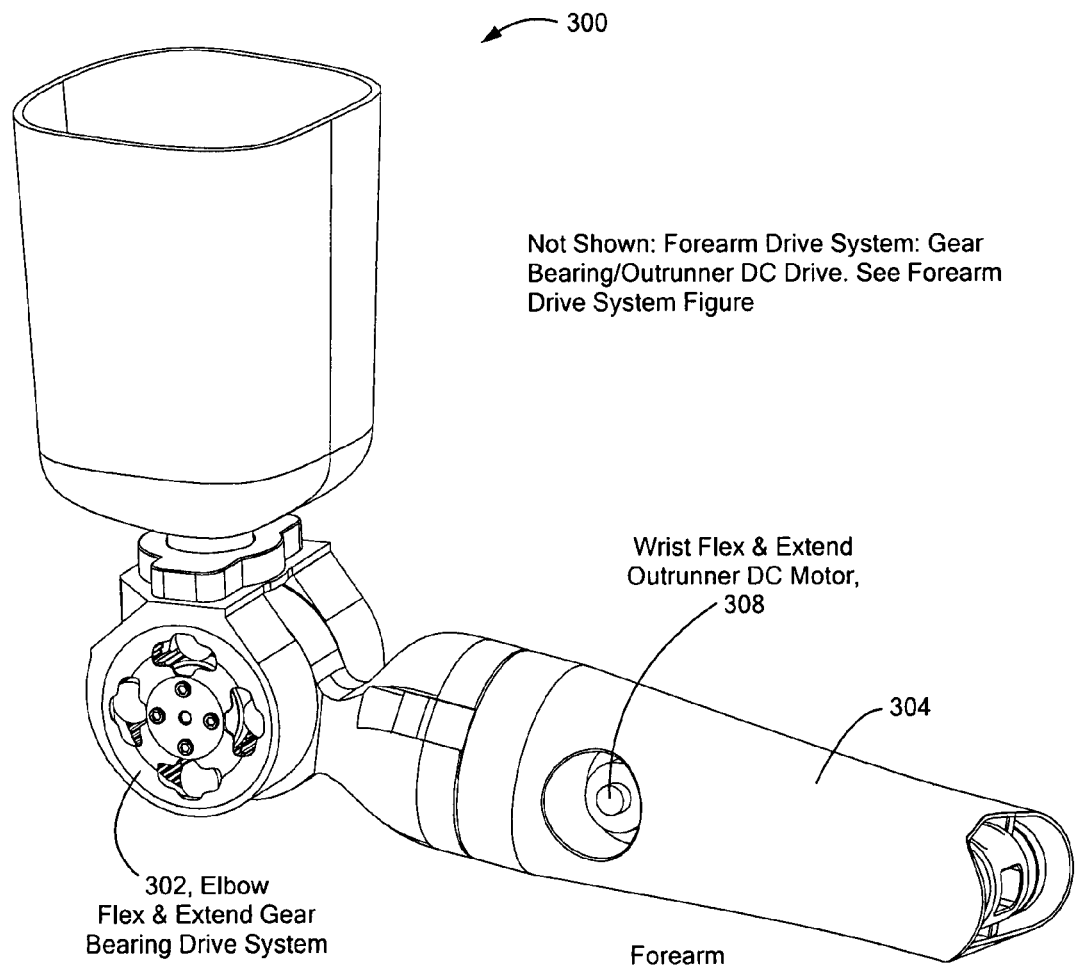
FIG. 33A is an isometric view of a prosthetic arm incorporating gear bearing drives according to the present invention.
Figure 33B:
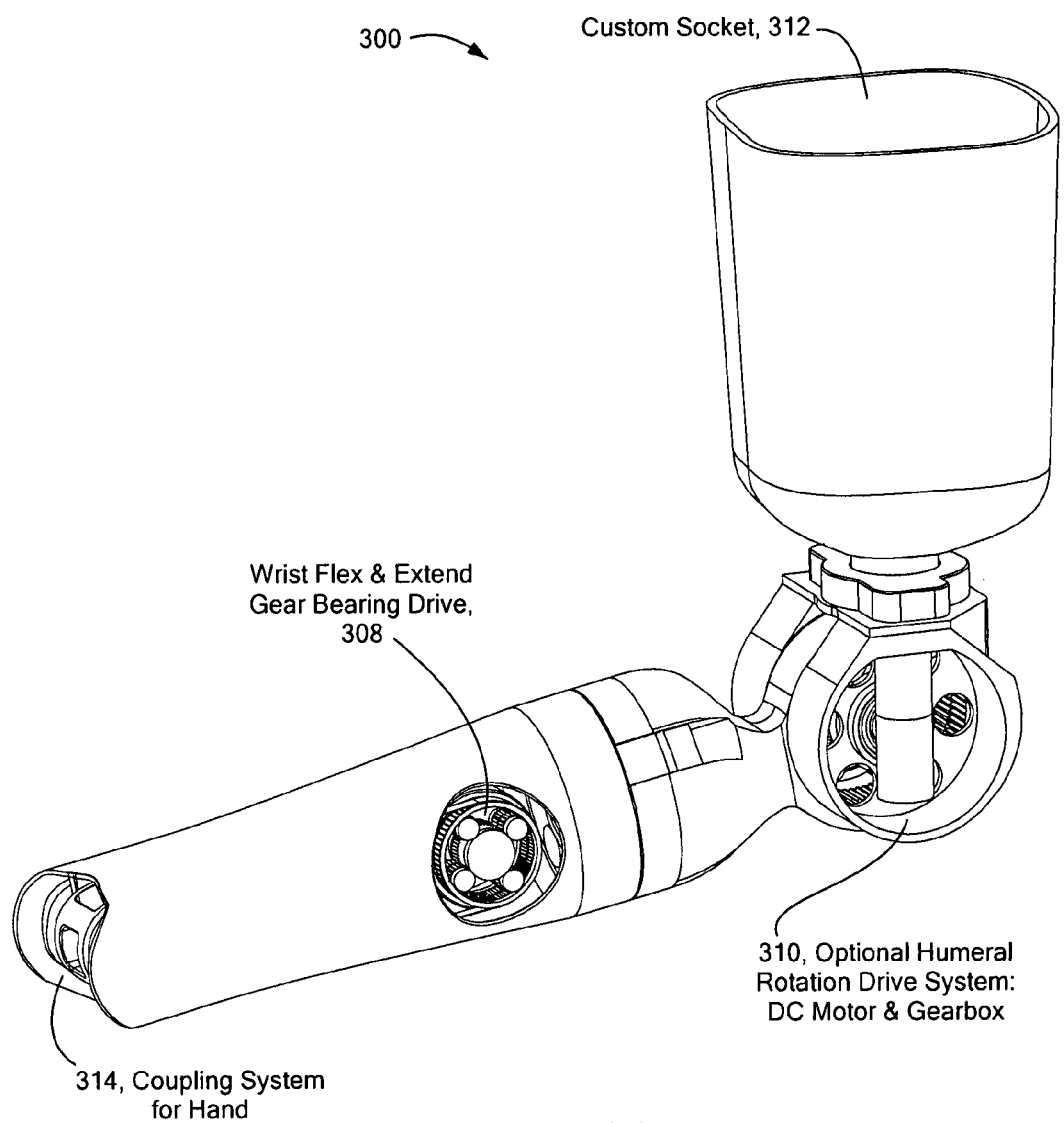
Figure 34A:
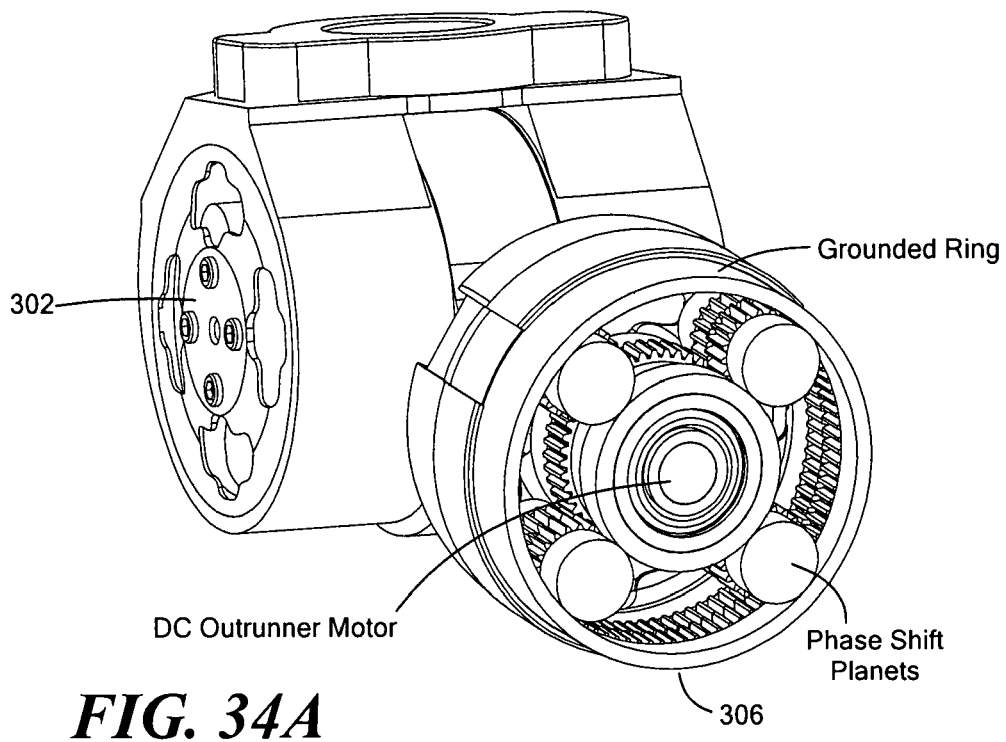
FIG. 34A is an isometric view of an elbow joint of the prosthetic arm of FIG. 33A.
Figure 34B:
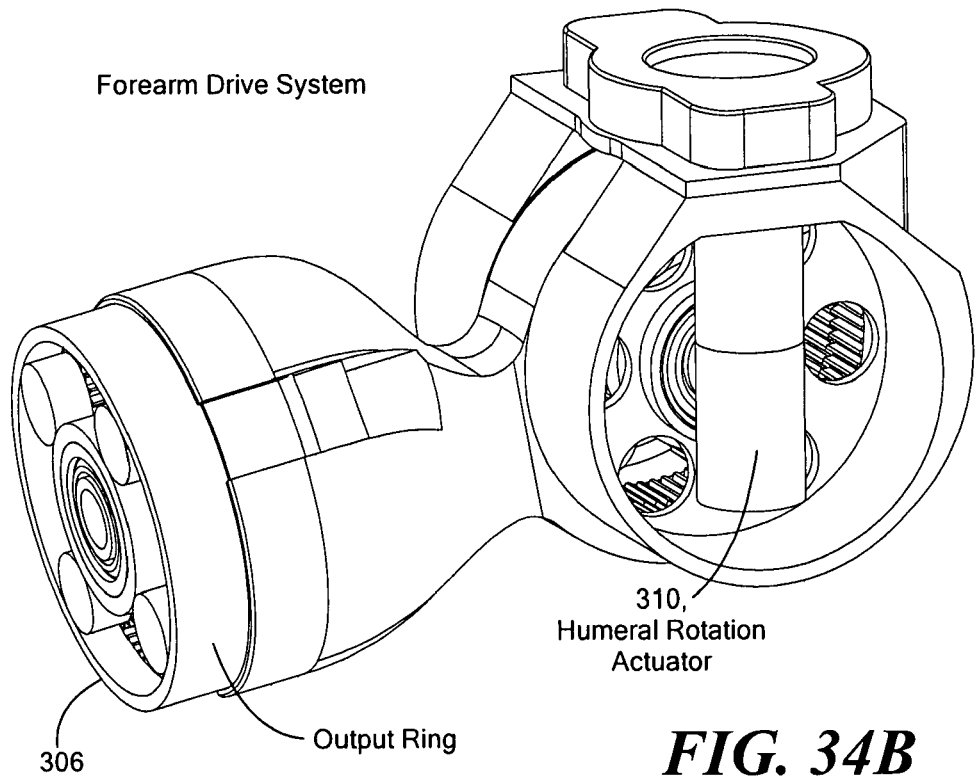
FIG. 34B is a further isometric view of the elbow and forearm drive of FIG. 34A.
Figure 35A:
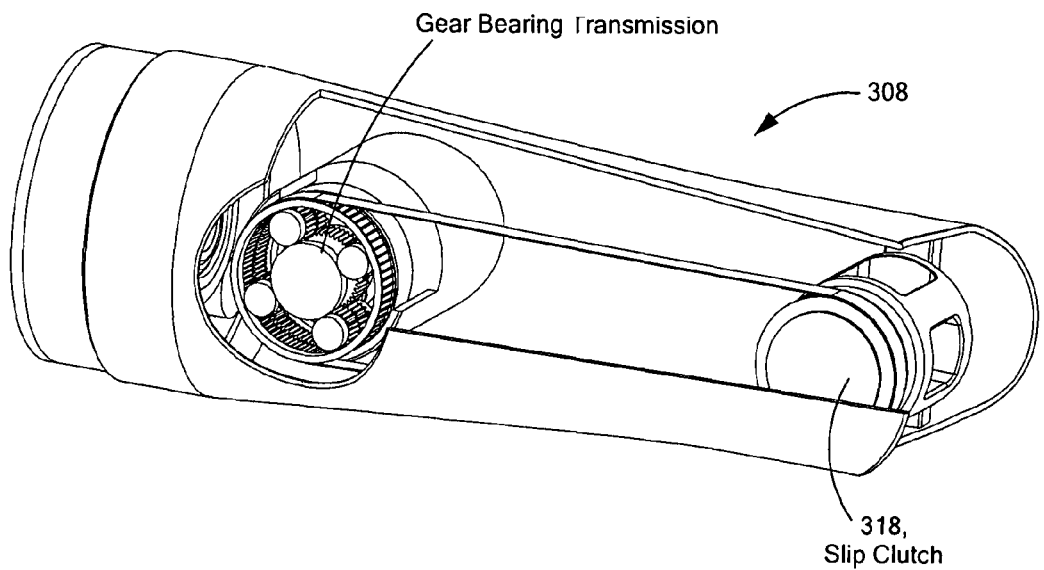
FIG. 35A is an isometric view of a forearm drive of the prosthetic arm of FIG. 33A.
Figure 35B:
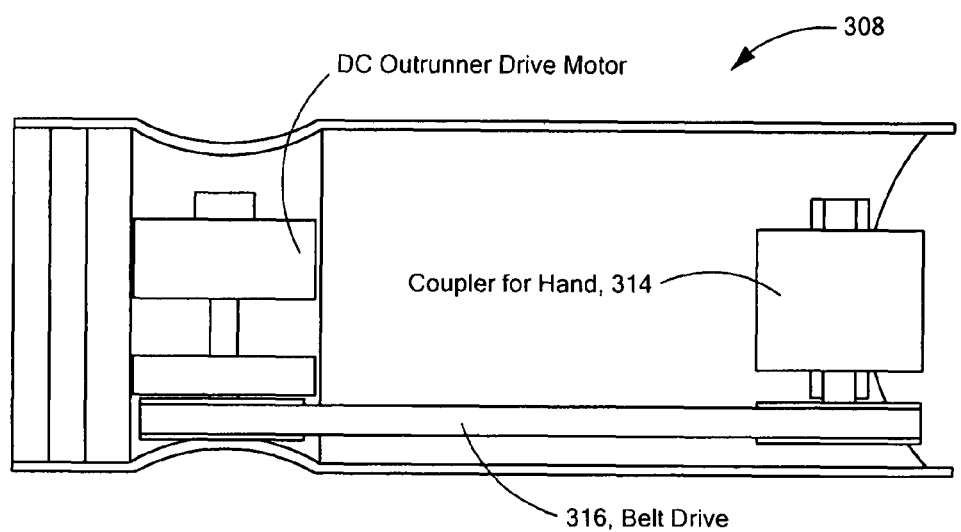
FIG. 35B is a further view of the forearm drive of the prosthetic arm of FIG. 35B.

One embodiment of a robot arm 200 incorporating the gear bearing drive is shown in FIG. 32. The illustrated robot arm has six degrees of freedom and possesses both high strength and exceptional precision in a lightweight compact package. The arm is modular, incorporating a series of joint modules and an end effector module. This modularity allows the fast design and prototyping of these arms at any size and with any number of required degrees of freedom at the end-effector.

Each joint (shoulder 202, elbow 204, and wrist 206 in the embodiment shown) is driven with its own gear bearing drive, which combines an actuator, joint load support, and position sensing into a space which is volumetrically smaller than any current robot arm of similar capabilities. The gear bearing drive's comprehensive functionality facilitates the modular design structure of the robot arm, making the arm reconfigurable and highly adaptable to a variety of tasks. The robot utilizes one gear bearing drive per degree-of-freedom. In the embodiment shown, the shoulder and elbow joints use identical gear bearing drives, and the wrist joint uses a smaller gear bearing drive.

Each gear bearing drive joint assembly includes its own controller and encoder. The gear bearing drives are configured with the encoder and joint position synchronized so they can be installed or replaced without having to re-reference the zeros of the robot arm. When inserted into a pre-indexed joint mounting, the user only needs to enter an arm type code into a master controller and the system is ready to use. The robot arm's configuration can be changed by simply replacing, adding, or removing sections from the robot arm.

The payload capacity of the robot arm can determined by the size and strength of the arm, as desired for the tasks to be performed. In one embodiment, the approximate weight of the robot arm shown is about 15 lbs with arms comprised of aluminum.

The gear bearing drive is illustrated in a 3-4 degree of freedom prosthetic arm 300 in FIGS. 33A to 35B. The arm includes a gear bearing drive located at the elbow 302 for flexion and extension. Within the forearm casing 304, close to the elbow, a gear bearing drive 306 is provided for forearm rotation, that is, pronation and supination. Also within the forearm casing, a gear bearing drive 308 is provided for wrist flexion and extension. An optional humeral rotation drive 310 may be provided. A socket 312 for the upper arm and coupling system 314 for the hand are also provided.

The joints are capable of 120 deg/s rotational speed. In one embodiment, the estimated mass/weight of the arm is approximately 1.2 kg/2.75 lbs for the components shown, excluding the socket. The gear bearing drive at the elbow joint has an outer diameter of 2.3" and a length of 2.5". This compact size allows the joint to be fully contained within the space that a regular elbow occupies.

The external rotor motor utilized in the arm shares the same form factor with power capabilities from 55-210 W, so the system can be optimized for a specific application, such as heavy lifting or ultra low power consumption.

For safety, strain gauges can be incorporated into the joints to enable the controller to monitor the applied joint torque and backdrive when an overloaded condition is detected. In another alternative, the gear ratio of the gear bearing drive can be configured so that the drive cannot be back driven. Thus, the motor has no energy consumption when an elbow joint, for example, is under static loading.

The forearm (pronate-supinate) rotation is powered by a gear bearing drive 306 that also provides the coupling system that connects the elbow to the forearm. The input stage ring gear is mounted and grounded to the elbow and the forearm is directly mounted to the output ring gear. The forearm can be constructed of lightweight composites, which offer the necessary strength and stiffness.

For the wrist flex-extend motion, a gear bearing drive 308 is mounted in the upper forearm. See FIGS. 35A and B. Power is transferred from this system to the wrist with a no-slip belt drive 316 or transmission shaft. The coupler for the wrist is detailed based the requirements of the hand and can also include a slip clutch 318 to protect the user from excessive impulsive loads.

Figure 36:
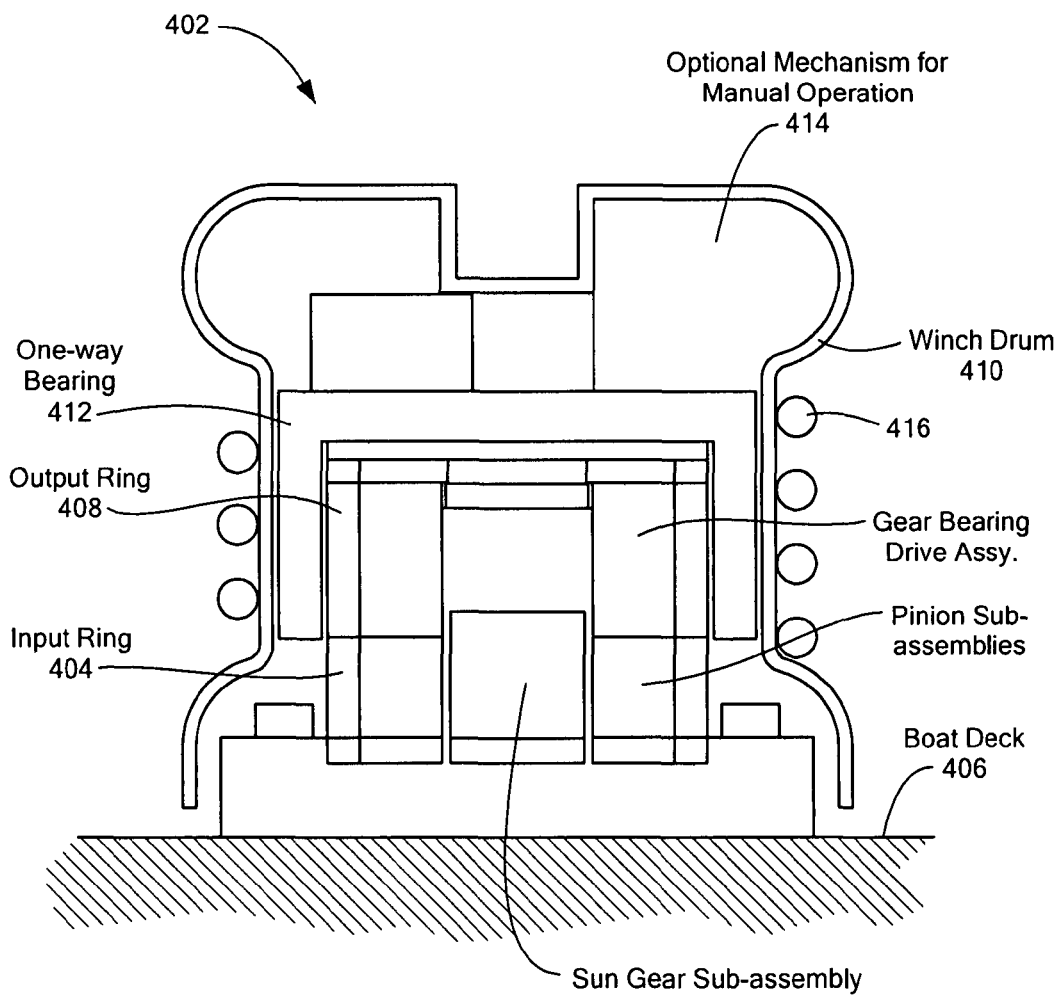
FIG. 36 is a schematic view of a winch assembly incorporating a gear bearing drive according to the present invention.

In another embodiment, suitable for use in a winching device, the gear bearing drive's input stage is grounded and the output stage is connected to a winch drum. Specifically in the case of a sailboat winch 402 (FIG. 36), the input stage 404 is grounded to the boat deck 406 and the output stage 408 is connected to the winch drum 410, which is coaxially mounted. A one-way clutch or bearing 412 can be implemented between the output stage and the winch drum to allow for manual operation, with a suitable mechanism 414 for manual operation. The gear-bearing drive resides inside the winch drum; it drives rotation of the winch and supports the loading from the lines 416. The winch can be self-tailing or non-self-tailing. Similarly, the gear bearing drive can integrate with other winches such as vehicle winches, construction winches, etc., or alternatively, can be used as a pancake style gear motor driving the winch or other machine externally or remotely.

The gear bearing drive can be used in a variety of other applications. For example, in manufacturing, it can function as an actuator and/or a joint to drive machinery. In CNC machines, it can replace servomotors and/or precision positioning stages. In bionics it can serve as a joint and/or actuator for mechatronic body parts. It can actuate a wide variety of objects, such as windows and haptic interfaces. It can replace standard DC brushed and brushless gear motors. In aerospace, the gear bearing drive can be used to control or actuate landing gear, wing control surfaces, hatches, and the like.

The invention is not to be limited by what has been particularly shown and described, except as indicated by the appended claims.

What is claimed is:

1. A gear bearing drive comprising an assembly having an input stage and an output stage, the assembly comprising:
   a sun gear sub-assembly comprising:
      a sun gear including a plurality of sun gear teeth extending radially outwardly and disposed circumferentially around the sun gear, and
      a motor having an external rotor disposed inside an interior region of the sun gear and concentrically surrounded by the sun gear teeth, the sun gear rotatable with the external rotor;
   a plurality of pinion sub-assemblies disposed to interface with and revolve around the sun gear sub-assembly, each pinion sub-assembly comprising an input pinion gear meshing with the sun gear and an output pinion gear, and an output ring gear disposed to mesh with the output pinion gear of each pinion sub-assembly.

2. The gear bearing drive of claim 1, wherein the external rotor of the motor comprises a plurality of magnets fixed at intervals around an interior surface of the sun gear.

3. The gear bearing drive of claim 1, further comprising an encoder drive shaft mounted to the sun gear sub-assembly for rotation therewith.

4. The gear bearing drive of claim 1, wherein the motor comprises a DC motor.

5. The gear bearing drive of claim 1, wherein the sun gear sub-assembly further comprises a sun gear roller bearing surface on an input stage of the gear bearing drive facing radially outwardly, and the pinion sub-assemblies further comprise a pinion roller surface facing radially inwardly and in bearing engagement against the radially outward sun gear roller bearing surface, to transfer radial forces.

6. The gear bearing drive of claim 1, wherein the sun gear sub-assembly further comprises a sun gear roller bearing surface on an input stage of the gear bearing drive facing radially outwardly, and the sun gear includes a plurality of sun gear teeth extending radially from the sun gear at a determined pitch radius equal to the radius of the sun gear roller bearing surface.

7. The gear bearing drive of claim 1, wherein the sun gear includes a plurality of sun gear teeth extending radially from the sun gear, and ends of the sun gear teeth are chamfered from the tips to the roots to remove loads from the tips.

8. The gear bearing drive of claim 1, wherein the input pinion gear and the output pinion gear include a plurality of gear teeth extending radially, and ends of the gear teeth are chamfered from the tips to the roots to remove loads from the tips.

9. The gear bearing drive of claim 1, further comprising an output locking ring disposed to mate the pinion sub-assemblies to the output ring gear.

10. The gear bearing drive of claim 1, further comprising an input ring gear disposed to mesh with the input pinion gear of each pinion sub-assembly.

11. The gear bearing drive of claim 10, further comprising an input locking ring disposed to mate the pinion sub-assemblies to the input ring gear.

12. The gear bearing drive of claim 10, further comprising an output locking ring and an input locking ring disposed to mate the pinion sub-assemblies to the output ring gear and the input ring gear.

13. A gear bearing drive comprising an assembly having an input stage and an output stage, the assembly comprising:
   a sun gear sub-assembly comprising:
      a sun gear, and
      a motor having an external rotor disposed inside an interior region of the sun gear, the sun gear rotatable with the external rotor;
   a plurality of pinion sub-assemblies disposed to interface with and revolve around the sun gear sub-assembly, each pinion sub-assembly comprising an input pinion gear meshing with the sun gear and an output pinion gear;
   axially facing mating locking surfaces on the pinion sub-assemblies and the sun gear sub-assembly disposed to transfer axial forces therebetween; and
   an output ring gear disposed to mesh with the output pinion gear of each pinion sub-assembly.

14. The gear bearing drive of claim 13, further comprising axially facing mating locking surfaces on the pinion sub-assemblies and the output ring gear disposed to transfer axial forces therebetween.

15. The gear bearing drive of claim 13, further comprising a sun roller sub-assembly disposed at the output stage of the assembly, and axially facing mating locking surfaces on the pinion sub-assemblies and the sun roller sub-assembly disposed to transfer axial forces therebetween.

16. The gear bearing drive of claim 13, further comprising an input ring gear disposed to mesh with the input pinion gear of each pinion sub-assembly, and axially facing mating locking surfaces on the pinion sub-assemblies and the input ring gear disposed to transfer axial forces therebetween.

17. A gear bearing drive comprising an assembly having an input stage and an output stage, the assembly comprising:
   a sun gear sub-assembly comprising:
      a sun gear, and
      a motor having an external rotor disposed inside an interior region of the sun gear, the sun gear rotatable with the external rotor;
   a plurality of pinion sub-assemblies disposed to interface with and revolve around the sun gear sub-assembly, each pinion sub-assembly comprising an input pinion gear meshing with the sun gear and an output pinion gear, radially facing bearing surfaces on the pinion sub-assemblies and the sun gear sub-assembly disposed in rolling bearing contact; and
   an output ring gear disposed to mesh with the output pinion gear of each pinion sub-assembly.

18. The gear bearing drive of claim 17, further comprising an output locking ring disposed at the output stage of the assembly to lock the assembly together, and radially facing bearing surfaces on the pinion sub-assemblies and the output locking ring disposed in rolling bearing contact.

19. The gear bearing drive of claim 17, further comprising a sun roller sub-assembly disposed at the output stage of the assembly, and radially facing bearing surfaces on the pinion sub-assemblies and the sun roller sub-assembly disposed in rolling bearing contact.

20. The gear bearing drive of claim 17, further comprising:
   an input ring gear disposed to mesh with the input pinion gear of each pinion sub-assembly;
   an input locking ring disposed at the input stage of the assembly to lock the assembly together; and
   radially facing bearing surfaces on the pinion sub-assemblies and the input locking ring disposed in rolling bearing contact.

21. A gear bearing drive comprising an assembly having an input stage and an output stage, the assembly comprising:
   a sun gear sub-assembly comprising:
      a sun gear, and
      a motor having an external rotor disposed inside an interior region of the sun gear, the sun gear rotatable with the external rotor;
   a plurality of pinion sub-assemblies disposed to interface with and revolve around the sun gear sub-assembly, each pinion sub-assembly comprising an input pinion gear meshing with the sun gear and an output pinion gear;
   wherein the sun gear sub-assembly further comprises a locking groove defining axially facing sun gear locking surfaces, and the pinion sub-assemblies each further comprises an extended roller defining mating axial locking surfaces in engagement with the sun gear locking surfaces to transfer axial forces; and
   an output ring gear disposed to mesh with the output pinion gear of each pinion sub-assembly.

22. gear bearing drive comprising an assembly having an input stage and an output stage, the assembly comprising:
   a sun gear sub-assembly comprising:
      a sun gear, and
      a motor having an external rotor disposed inside an interior region of the sun gear, the sun gear rotatable with the external rotor;
   a plurality of pinion sub-assemblies disposed to interface with and revolve around the sun gear sub-assembly, each pinion sub-assembly comprising an input pinion gear meshing with the sun gear and an output pinion gear;
   a sun roller sub-assembly disposed at the output stage of the assembly, the sun roller sub-assembly comprising a sun roller bearing surface facing radially outwardly, and the pinion sub-assemblies further comprise a pinion roller surface facing radially inwardly and in bearing engagement against the radially outward sun roller bearing surface, to transfer radial forces; and
   an output ring gear disposed to mesh with the output pinion gear of each pinion sub-assembly.

23. The gear bearing drive of claim 22, wherein the sun roller sub-assembly further includes a sun roller locking surface facing axially from the sun gear and a sun roller locking ring comprising a sun roller locking surface facing axially toward the sun gear; and
   the pinion sub-assemblies each further comprises an extended roller defining mating axial locking surfaces in engagement with the sun roller locking surfaces to transfer axial forces.

24. A gear bearing drive comprising an assembly having an input stage and an output stage, the assembly comprising:
   a sun gear sub-assembly comprising:
      a sun gear, and
      a motor having an external rotor disposed inside an interior region of the sun gear, the sun gear rotatable with the external rotor;
   a plurality of pinion sub-assemblies disposed to interface with and revolve around the sun gear sub-assembly, each pinion sub-assembly comprising an input pinion gear meshing with the sun gear and an output pinion gear;
   a sun roller sub-assembly disposed on the output stage of the assembly, the sun roller sub-assembly comprising a sun roller locking ring comprising a sun roller locking surface facing axially toward the sun gear, and the pinion sub-assemblies each further comprises an extended roller defining mating axial locking surface in engagement with the sun roller locking surface to transfer axial forces; and
   an output ring gear disposed to mesh with the output pinion gear of each pinion sub-assembly.

25. A gear bearing drive, comprising an assembly having an input stage and an output stage, the assembly comprising:
   a sun gear sub-assembly comprising:
      a sun gear, and
      a motor having an external rotor disposed inside an interior region of the sun gear, the sun gear rotatable with the external rotor;
   a plurality of pinion sub-assemblies disposed to interface with and revolve around the sun gear sub-assembly, each pinion sub-assembly comprising an input pinion gear meshing with the sun gear and an output pinion gear;
   wherein each of the pinion sub-assemblies further comprise a support member, the input pinion gear and the output pinion gear supported by the support member, the support member including a roller bearing surface at the output stage in bearing engagement with a roller bearing surface on the output ring gear; and
   an output ring gear disposed to mesh with the output pinion gear of each pinion sub-assembly.

26. The gear bearing drive of claim 25, further comprising a sun roller sub-assembly disposed at the output stage of the assembly, the sun roller sub-assembly comprising a sun roller bearing surface facing radially outwardly, and the pinion roller bearing surface of the pinion sub-assemblies is further disposed in bearing engagement with the sun roller bearing surface.

27. A prosthetic arm incorporating a gear bearing drive according to claim 1, comprising:
 a limb comprising a forearm and an upper arm, a shoulder at an end of the upper arm, an elbow between the forearm and the upper arm, and a wrist at an end of the forearm; and
 the gear bearing drive disposed at least at one of the shoulder, the elbow, and the wrist.

28. The prosthetic arm of claim 27, further comprising a further gear bearing drive disposed at least at a second of the shoulder, elbow, and the wrist.

29. The prosthetic arm of claim 27, further comprising a gear bearing drive disposed at each of the shoulder, the elbow, and the wrist.

30. A motorized joint comprising:
 a gear transmission having an input stage comprising an input gear including one or more force transmitting surfaces and an output stage comprising an output gear interfacing with the input gear, and an output mating interface configured to provide a torque output to a device; and
 a motor comprising an external rotor and an internal stator, the external rotor disposed within an interior of the input gear of the gear transmission and concentrically surrounded by the one or more force transmitting surfaces of the input gear for driving the input gear.

31. The motorized joint of claim 30, wherein the output mating interface is configured to mate with a prosthetic arm.

32. The motorized joint of claim 30, wherein the output mating interface is configured to mate with a robotic arm.

33. The motorized joint of claim 32, wherein the gear transmission further comprises
 a sun gear sub-assembly comprising:
  a sun gear, and
  a motor having an external rotor disposed inside an interior region of the sun gear, the sun gear rotatable with the external rotor;
 a plurality of pinion sub-assemblies disposed to interface with and revolve around the sun gear sub-assembly, each pinion sub-assembly comprising an input pinion gear meshing with the sun gear and an output pinion gear, and an output ring gear disposed to mesh with the output pinion gear of each pinion sub-assembly.

34. The motorized joint of claim 30, wherein the input gear comprises a sun gear, and the external rotor of the motor comprises a plurality of magnets fixed at intervals around an interior surface of the sun gear.

35. The motorized joint of claim 30, further comprising a sun gear sub-assembly, the sun gear sub-assembly including the input gear, and an encoder drive shaft mounted to the sun gear sub-assembly for rotation therewith.

36. The motorized joint of claim 30, wherein the motor comprises a DC motor.

37. The motorized joint of claim 30, further comprising a sun gear sub-assembly and a plurality of pinion sub-assemblies, and axially facing mating locking surfaces on the pinion sub-assemblies and the sun gear sub-assembly disposed to transfer axial forces therebetween.

38. The motorized joint of claim 30, wherein the output gear comprises an output ring gear, and further comprising a plurality of pinion sub-assemblies, and axially facing mating locking surfaces on the pinion sub-assemblies and the output ring gear disposed to transfer axial forces therebetween.

39. The motorized joint of claim 30, further comprising a plurality of pinion sub-assemblies and a sun roller sub-assembly disposed at the output stage of the assembly, and axially facing mating locking surfaces on the pinion sub-assemblies and the sun roller sub-assembly disposed to transfer axial forces therebetween.

40. The motorized joint of claim 30, further comprising a plurality of pinion sub-assemblies and an input ring gear disposed to mesh with an input pinion gear of each of the plurality of pinion sub-assemblies, and axially facing mating locking surfaces on the pinion sub-assemblies and the input ring gear disposed to transfer axial forces therebetween.

41. The motorized joint of claim 30, further comprising a sun gear sub-assembly and a plurality of pinion sub-assemblies, wherein radially facing bearing surfaces on the pinion sub-assemblies and the sun gear sub-assembly are disposed in rolling bearing contact.

42. The motorized joint of claim 30, further comprising an output locking ring disposed at the output stage of the assembly to lock the assembly together, a plurality of pinion sub-assemblies, and radially facing bearing surfaces on the pinion sub-assemblies and the output locking ring disposed in rolling bearing contact.

43. The motorized joint of claim 30, further comprising a sun roller sub-assembly disposed at the output stage of the assembly, a plurality of pinion sub-assemblies, and radially facing bearing surfaces on the pinion sub-assemblies and the sun roller sub-assembly disposed in rolling bearing contact.

44. The motorized joint of claim 30, further comprising:
 an input ring gear disposed to mesh with an input pinion gear of each of a plurality of pinion sub-assemblies;
 an input locking ring disposed at the input stage of the assembly to lock the assembly together; and
 radially facing bearing surfaces on the pinion sub-assemblies and the input ring gear disposed in rolling bearing contact.

45. The motorized joint of claim 30, further comprising a sun gear sub-assembly, wherein the sun gear sub-assembly further comprises a sun gear roller bearing surface on an input stage of the gear transmission facing radially outwardly, and further comprising a plurality of pinion sub-assemblies, wherein the pinion sub-assemblies further comprise a pinion roller surface facing radially inwardly and in bearing engagement against the radially outward sun gear roller bearing surface, to transfer radial forces.

46. The motorized joint of claim 30, wherein the gear transmission further comprises:
 a sun gear;
 a plurality of pinion gears disposed to interface with and revolve around the sun gear;
 the motor having an external rotor is disposed inside an interior region of one of the pinion gears, the pinion gear rotatable with the external rotor; and
 an output ring gear disposed to mesh with the pinion gears.

47. The motorized joint of claim 46, further comprising a further motor having an external rotor disposed inside an interior region of another of the pinion gears, the pinion gear rotatable with the external rotor.

* * * * *